United States Patent
Sawada et al.

(10) Patent No.: US 12,400,457 B2
(45) Date of Patent: Aug. 26, 2025

(54) OBJECT DETECTION DEVICE, MONITORING DEVICE, TRAINING DEVICE, AND MODEL GENERATION METHOD

(71) Applicant: Mitsubishi Electric Corporation, Tokyo (JP)

(72) Inventors: Tomoya Sawada, Tokyo (JP); Ken Fukuchi, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 281 days.

(21) Appl. No.: 18/037,020

(22) PCT Filed: Dec. 25, 2020

(86) PCT No.: PCT/JP2020/048617
§ 371 (c)(1),
(2) Date: May 15, 2023

(87) PCT Pub. No.: WO2022/137476
PCT Pub. Date: Jun. 30, 2022

(65) Prior Publication Data
US 2023/0410532 A1    Dec. 21, 2023

(51) Int. Cl.
*G06K 9/00*    (2022.01)
*G01J 5/00*    (2022.01)
(Continued)

(52) U.S. Cl.
CPC ............ *G06V 20/58* (2022.01); *G01J 5/0025* (2013.01); *G06T 7/0002* (2013.01); *G06T 7/246* (2017.01);
(Continued)

(58) Field of Classification Search
CPC .. G06V 20/58; G06V 10/764; G06V 10/7715; G06V 10/774; G06V 10/82;
(Continued)

(56) References Cited

U.S. PATENT DOCUMENTS

| | | |
|---|---|---|
| 2010/0086175 A1 | 4/2010 | Yokono et al. |
| 2010/0086176 A1 | 4/2010 | Yokono et al. |

(Continued)

FOREIGN PATENT DOCUMENTS

| | | | |
|---|---|---|---|
| CN | 102103753 B | * 9/2016 | ............. G06T 7/215 |
| CN | 109255352 A | * 1/2019 | ........... G06K 9/3241 |

(Continued)

OTHER PUBLICATIONS

International Search Report for PCT/JP2020/048617 (PCT/ISA/210) mailed on Mar. 16, 2021.

(Continued)

*Primary Examiner* — Xin Jia
(74) *Attorney, Agent, or Firm* — Birch, Stewart, Kolasch & Birch, LLP

(57) ABSTRACT

An object detection device includes an image data acquiring unit that acquires image data indicating an image captured by a camera, a first feature amount extracting unit that generates a first feature map using the image data, a second feature amount extracting unit that generates a second feature map using the image data, and generates a third feature map by performing addition or multiplication of the second feature map using the first feature map and weighting the second feature map, and the object detection unit that detects an object in the captured image using the third feature map. A first feature amount in the first feature map uses a mid-level feature corresponding to objectness, and a second feature amount in the second feature map uses a high-level feature.

29 Claims, 33 Drawing Sheets

(51) Int. Cl.
  *G06T 7/00* (2017.01)
  *G06T 7/246* (2017.01)
  *G06T 7/73* (2017.01)
  *G06V 10/764* (2022.01)
  *G06V 10/77* (2022.01)
  *G06V 10/774* (2022.01)
  *G06V 10/82* (2022.01)
  *G06V 20/58* (2022.01)

(52) U.S. Cl.
  CPC .............. *G06T 7/73* (2017.01); *G06V 10/764* (2022.01); *G06V 10/7715* (2022.01); *G06V 10/774* (2022.01); *G06V 10/82* (2022.01); *G06T 2207/10016* (2013.01); *G06T 2207/20081* (2013.01); *G06T 2207/20084* (2013.01); *G06T 2207/30261* (2013.01); *G06V 2201/08* (2022.01)

(58) Field of Classification Search
  CPC .. G06V 2201/08; G06V 10/462; G06V 10/62; G06V 10/806; G01J 5/0025; G06T 7/0002; G06T 7/246; G06T 7/73; G06T 2207/10016; G06T 2207/20081; G06T 2207/20084; G06T 2207/30261
  See application file for complete search history.

(56) References Cited

U.S. PATENT DOCUMENTS

| | | |
|---|---|---|
| 2011/0135192 A1 | 6/2011 | Yokono |
| 2015/0161481 A9 | 6/2015 | Yokono |
| 2019/0197345 A1 | 6/2019 | Sawada et al. |
| 2019/0286940 A1 | 9/2019 | Shen et al. |
| 2020/0242752 A1 | 7/2020 | Kakishita et al. |
| 2021/0264608 A1 | 8/2021 | Ishikawa et al. |
| 2021/0383166 A1* | 12/2021 | Nie .................... G06T 7/73 |
| 2022/0101628 A1 | 3/2022 | Sun et al. |

FOREIGN PATENT DOCUMENTS

| | | | |
|---|---|---|---|
| CN | 110046598 A | 7/2019 | |
| CN | 110175186 A | 8/2019 | |
| EP | 3 232 371 A1 | 10/2017 | |
| JP | 2009-69996 A | 4/2009 | |
| JP | 2010-108476 A | 5/2010 | |
| JP | 2017-191608 A | 10/2017 | |
| JP | 2019-27927 A | 2/2019 | |
| JP | 2019/160317 A | 9/2019 | |
| JP | 2020-46858 A | 3/2020 | |
| JP | 2020-113000 A | 7/2020 | |
| WO | WO-2016129950 A1 * | 8/2016 | ............... A47L 5/22 |
| WO | WO 2018/051459 A1 | 3/2018 | |

OTHER PUBLICATIONS

Liu et al., "SSD: Single Shot MultiBox Detector", arXiv:1512.02325v5 [cs.CV], Dec. 29, 2016, pp. 1-17, https://arxiv.org/pdf/1512.02325v5.pdf.

Tan et al., "EfficientNet: Rethinking Model Scaling for Convolutional Neural Networks", Proceedings of the 36th International Conference on Machine Learning, PMLR 97, 2019, pp. 6105-6114, total 10 pages, http://proceedings.mlr.press/v97/tan19a/tan19a.pdf.

Tan et al., "EfficientDet: Scalable and Efficient Object Detection", Proceedings of the IEEE/CVF Conference on Computer Vision and Pattern Recognition (CVPR), 2020, arXiv:1911.09070v7 [cs.CV], Jul. 27, 2020, pp. 1-10.

Extended European Search Report for European Application No. 20966963.9, dated Jan. 2, 2024.

Mahdi et al., "DeepFeat: A Bottom-Up and Top-Down Saliency Model Based on Deep Features of Convolutional Neural Networks," IEEE Transactions on Cognitive and Developmental Systems, vol. 12, No. 1, 2020, pp. 54-63.

Patel et al., "Top-Down and Bottom-Up Cues Based Moving Object Detection for Varied Background Video Sequences," Advances in Multimedia, 2014, pp. 1-20.

Chinese Office Action and Search Report for Chinese Application No. 202080108058.1, dated Mar. 31, 2025, with English translation.

* cited by examiner

FIG. 3

| cars (same direction) |
| large vehicles (same direction) |
| motorbikes (same direction) |
| cars (opposite direction) |
| large vehicles (opposite direction) |
| motorbikes (opposite direction) |
| pedestrians |
| bicycles |

OBJECT DETECTION DEVICE, MONITORING DEVICE, TRAINING DEVICE, AND MODEL GENERATION METHOD

TECHNICAL FIELD

The present disclosure relates to an object detection device, a monitoring device, a training device, and a model generation method.

BACKGROUND ART

Conventionally, a technique of detecting individual objects in a video captured by a camera in real time using a convolutional neural network (hereinafter, sometimes referred as "CNN") that can be trained by deep learning has been developed. That is, a technique of estimating the position of each object and estimating the type of each object has been developed. For example, Single Shot MultiBox Detector (SSD), You Only Look Once (YOLO), and Faster R-CNN (Region-based Convolutional Neural Network) have been developed. Non-Patent Literature 1 discloses the SSD.

CITATION LIST

Non-Patent Literature

Non-Patent Literature 1: Wei Liu, Dragomir Anguelov, Dumitru Erhan, Christian Szegedy, Scott Reed, Cheng-Yang Fu, Alexander C. Berg, "SSD: Single Shot MultiBox Detector," v5, 29 Dec. 2016, https://arxiv.org/pdf/1512.02325v5.pdf

SUMMARY OF INVENTION

Technical Problem

Conventional object detection uses a deep CNN. Therefore, spatial information is lost mainly due to pooling. As a result, particularly when the size of an object in an image is small, there is a problem that it is technically difficult to estimate the position of the object. That is, there is a problem that it is technically difficult to detect a small object.

Here, in the conventional object detection, it is conceivable to cope with the detection of a small object by increasing the size of each feature map. However, by increasing the size of each feature map in the deep CNN, the amount of calculation increases explosively. For this reason, such a method is impractical.

The present disclosure has been made to solve the above problems, and an object thereof is to achieve the detection of a small object.

Solution to Problem

An object detection device according to the present disclosure including an image data acquirer to acquire image data indicating an image captured by a camera; a first feature amount extractor to generate a first feature map using the image data; a second feature amount extractor to generate a second feature map using the image data and to generate a third feature map by performing addition or multiplication of the second feature map using the first feature map and weighting the second feature map; and an object detector to detect an object in the image captured using the third feature map, wherein a first feature amount in the first feature map uses a mid-level feature corresponding to objectness, and a second feature amount in the second feature map uses a high-level feature.

Advantageous Effects of Invention

According to the present disclosure, with the configuration described above, the detection of a small object can be achieved.

BRIEF DESCRIPTION OF DRAWINGS

FIG. 3 is an explanatory diagram illustrating an example of classes classified by the object detection unit in the object detection device according to the first embodiment.

DESCRIPTION OF EMBODIMENTS

Hereinafter, in order to describe the present disclosure in more detail, embodiments for carrying out the present disclosure will be described with reference to the accompanying drawings.

First Embodiment

Figure 1:
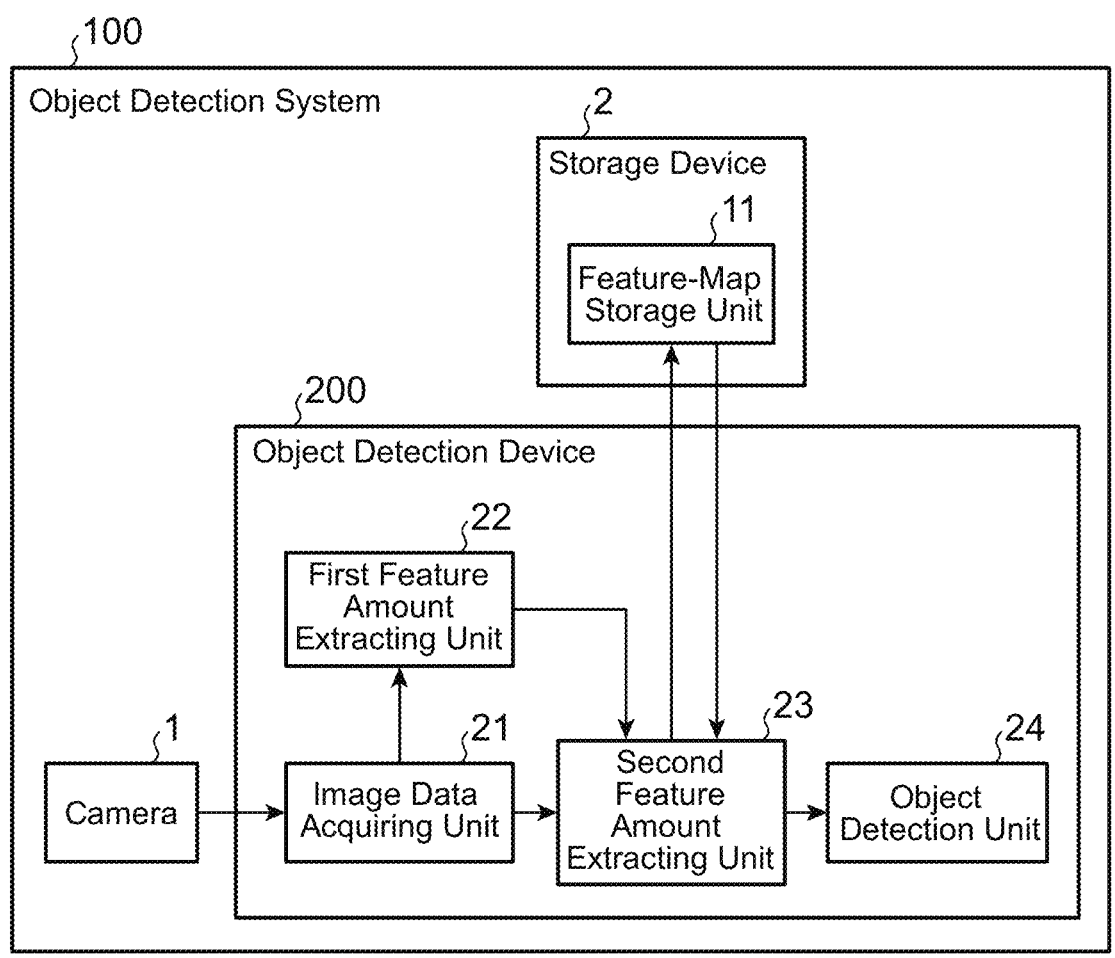
FIG. 1 is a block diagram illustrating the main part of an object detection system including an object detection device according to a first embodiment.
Figure 2:
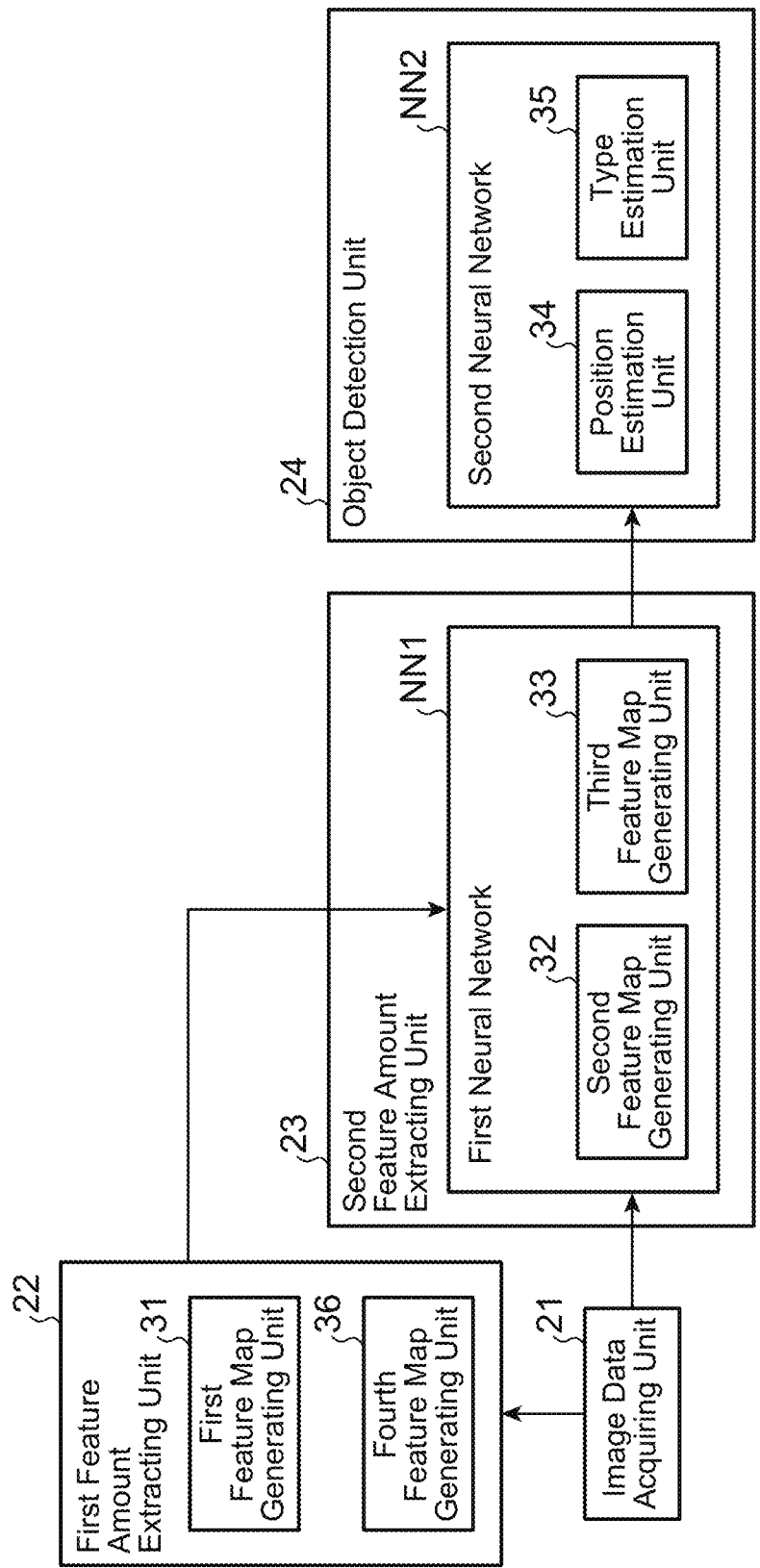
FIG. 2 is a block diagram illustrating the main parts of a first feature amount extracting unit, a second feature amount extracting unit, and an object detection unit in the object detection device according to the first embodiment.

FIG. 1 is a block diagram illustrating the main part of an object detection system including an object detection device according to a first embodiment. FIG. 2 is a block diagram illustrating the main parts of a first feature amount extracting unit, a second feature amount extracting unit, and an object detection unit in the object detection device according to the first embodiment. The object detection system including the object detection device according to the first embodiment will be described with reference to FIGS. 1 and 2.

As illustrated in FIG. 1, an object detection system 100 includes a camera 1, a storage device 2, and an object detection device 200. The storage device 2 includes a feature-map storage unit 11. The object detection device 200 includes an image data acquiring unit 21, a first feature amount extracting unit 22, a second feature amount extracting unit 23, and an object detection unit 24. The camera 1 includes, for example, a monitoring camera, a security camera, or an electronic mirror camera. That is, the camera 1 includes a video capturing camera. The storage device 2 includes a memory.

Hereinafter, an example in a case where the camera 1 includes an electronic mirror camera will be mainly described. In this case, the camera 1, the storage device 2, and the object detection device 200 are provided in a vehicle (not illustrated). Hereinafter, such a vehicle may be referred to as "host vehicle".

As illustrated in FIG. 2, the first feature amount extracting unit 22 includes a first feature map generating unit 31. The second feature amount extracting unit 23 includes a first neural network NN1. The first neural network NN1 includes a second feature map generating unit 32 and a third feature map generating unit 33. The object detection unit 24 includes a second neural network NN2. The second neural network NN2 includes a position estimation unit 34 and a type estimation unit 35.

The image data acquiring unit 21 acquires image data indicating an image captured by the camera 1. That is, the image data acquiring unit 21 acquires image data indicating individual still images (hereinafter, sometimes referred to as "captured images") constituting a video captured by the camera 1.

The first feature map generating unit 31 generates one feature map (hereinafter, referred to as "first feature map") FM1 corresponding to an individual captured image using the image data acquired by the image data acquiring unit 21. The first feature map FM1 includes a plurality of feature amounts (hereinafter, referred to as "first feature amounts") arranged two-dimensionally. Each of the first feature amounts uses a mid-level feature corresponding to object-ness.

Here, "mid-level" in the mid-level feature is a level equivalent to a level based on a human visual model. That is, such "mid-level" is lower than a feature level used in conventional object detection.

Specifically, for example, each of the first feature amounts uses saliency. The first feature map generating unit 31 generates a saliency map by performing saliency estimation. At that time, the first feature map generating unit 31 generates a saliency map by a method similar to the method described in Reference Literature 1 below. That is, the first feature map generating unit 31 generates the saliency map by a generation method similar to the generation method performed by the image feature map generating unit in the object detection device described in Reference Literature 1.

REFERENCE LITERATURE 1

WO 2018/051459

By such a method, the saliency map is directly generated using the image data acquired by the image data acquiring unit 21 not through other feature maps. In addition, the saliency map is generated without using the CNN.

A fourth feature map generating unit 36 generates a plurality of feature maps (hereinafter, referred to as "fourth feature maps") FM4 corresponding to the first feature map FM1 from the first feature map FM1 generated by the first feature map generating unit 31. Specifically, the fourth feature map generating unit 36 performs convolution to generate the plurality of fourth feature maps FM4. Each of the fourth feature map FM4 includes a plurality of feature amounts (hereinafter, referred to as "fourth feature amounts") arranged two-dimensionally. Each of the fourth feature amounts uses a middle-level feature.

The first feature map generating unit 31 and the fourth feature map generating unit 36 can be trained by unsupervised training. That is, the first feature amount extracting unit 22 can be trained by unsupervised training. Various known techniques can be used for such unsupervised training. Detailed description of these techniques will be omitted.

The second feature map generating unit 32 generates a plurality of feature maps (hereinafter, "second feature maps") FM2 corresponding to individual captured images using the image data acquired by the image data acquiring unit 21. Each of the second feature map FM2 includes a plurality of feature amounts (hereinafter, referred to as "second feature amounts") arranged two-dimensionally. Each of the second feature amounts uses a high-level feature.

Here, "high level" in the high-level feature is a level equivalent to the feature level used in the conventional object detection. That is, such "high-level" is higher than the level based on the human visual model.

Specifically, for example, the CNN includes a portion of the first neural network NN1 corresponding to the second feature map generating unit 32. The plurality of second feature maps FM2 are sequentially generated by the CNN.

The third feature map generating unit 33 weights the second feature map by addition or multiplication of the second feature map FM2 using the first feature map FM1, thereby generating a plurality of feature maps (hereinafter, "third feature maps") FM3 based on the plurality of second feature maps FM2.

Hereinafter, specific examples of a method of generating the plurality of third feature maps FM3 by the third feature map generating unit 33 will be described.

<Generation Method by Addition (1)>

For example, the third feature map generating unit 33 performs addition of individual first feature amounts in the first feature map FM1 to corresponding second feature amounts in the individual second feature maps FM2. Specifically, the third feature map generating unit 33 first duplicates one first feature map FM1 by the number of the second feature maps FM2. Then, the third feature map generating unit 33 associates each of the duplicated first feature maps FM1 with each of the individual second feature maps FM2, and adds the first feature map FM1 and the second feature map FM2 in units of pixels in each layer. That is, the third feature map generating unit 33 spatially adds the first feature map FM1 and the second feature map FM2.

As a result, the third feature map generating unit 33 weights the second feature map FM2 using the first feature map FM1. That is, the third feature map generating unit 33 weights the corresponding second feature amounts in the individual second feature maps FM2.

<Generation Method by Multiplication (1)>

For example, the third feature map generating unit 33 performs multiplication of the individual first feature amounts in the first feature map FM1 by corresponding second feature amounts in the individual second feature maps FM2. Specifically, the third feature map generating unit 33 first duplicates one first feature map FM1 by the number of the second feature maps FM2. Then, the third feature map generating unit 33 associates each of the duplicated first feature maps FM1 with each of the individual second feature maps FM2, and multiplies the first feature map FM1 by the second feature map FM2 in units of pixels for each layer. That is, the third feature map generating unit 33 spatially multiplies the first feature map FM1 by the second feature map FM2.

As a result, the third feature map generating unit 33 weights the second feature map FM2 using the first feature map FM1. That is, the third feature map generating unit 33 weights the corresponding second feature amounts in the individual second feature maps FM2.

<Generation Method by Addition (2)>

In the generation method, it is based on the premise that the fourth feature map generating unit 36 of the first feature amount extracting unit 22 generates a plurality of fourth feature maps FM4 corresponding to the first feature map from the first feature map FM1 generated by the first feature map generating unit 31.

For example, the third feature map generating unit 33 performs addition of individual fourth feature amounts in the fourth feature maps FM4 to corresponding second feature amounts in the second feature maps FM2 corresponding to the fourth feature maps. Specifically, the third feature map generating unit 33 associates each of the fourth feature maps FM4 with each of the second feature maps FM2, and adds the fourth feature map FM4 and the second feature map FM2 in units of pixels in each layer. That is, the third feature map generating unit 33 spatially adds the fourth feature map FM4 and the second feature map FM2.

As a result, the third feature map generating unit 33 weights the second feature map FM2 using the first feature map FM1, more specifically, using the fourth feature map FM4 generated using the first feature map FM1. That is, the third feature map generating unit 33 weights the corresponding second feature amounts in the individual second feature maps FM2.

<Generation Method by Multiplication (2)>

Also in the generation method, it is based on the premise that the fourth feature map generating unit 36 of the first feature amount extracting unit 22 generates a plurality of fourth feature maps FM4 corresponding to the first feature map from the first feature map FM1 generated by the first feature map generating unit 31, similarly to <Generation Method by Addition (2)> Described Above.

For example, the third feature map generating unit 33 performs multiplication of the individual fourth feature amounts in the fourth feature maps FM4 by corresponding second feature amounts in the individual second feature maps FM2. Specifically, the third feature map generating unit 33 associates each of the fourth feature maps FM4 with each of the second feature maps FM2, and multiplies the fourth feature map FM4 by the second feature map FM2 in units of pixels in each layer. That is, the third feature map generating unit 33 spatially multiplies the fourth feature map FM4 by the second feature map FM2.

As a result, the third feature map generating unit 33 weights the second feature map FM2 using the first feature map FM1, more specifically, using the fourth feature map FM4 generated using the first feature map FM1. That is, the third feature map generating unit 33 weights the corresponding second feature amounts in the individual second feature maps FM2.

<Generation Method by Addition (3)>

For example, the third feature map generating unit 33 performs addition of the first feature map FM1 to a plurality of second feature maps FM2 in the dimensional direction of the second feature maps FM2, in other words, in the channel direction of the second feature maps FM2. In other words, the third feature map generating unit 33 concatenates the first feature map FM1 in the dimensional direction of the plurality of second feature maps FM2. Specifically, the third feature map generating unit 33 duplicates one first feature map FM1 by the number of the second feature maps FM2. That is, the third feature map generating unit 33 spatially adds the duplicated first feature maps FM1 to the plurality of second feature maps FM2 in the dimensional direction of the second feature maps FM2.

As a result, the third feature map generating unit 33 weights the second feature map FM2 using the first feature map FM1. That is, the third feature map generating unit 33 weights each of the second feature maps FM2 to increase the number of dimensions.

The third feature map generating unit 33 may set a value (hereinafter, referred to as "importance") W indicating a weight given to each of the second feature amounts on the basis of at least one of structural similarity (SSIM) or image similarity correlation when performing weighting in <Generation Method by Addition (1)>, <Generation Method by Multiplication (1)>, <Generation Method by Addition (2)>, and <Generation Method by Multiplication (2)>. For example, the third feature map generating unit 33 sets the importance W to a larger value as the SSIM index becomes larger. Further, for example, the third feature map generating unit 33 sets the importance W to a larger value as the correlation similarity index becomes larger.

By setting the importance W using the SSIM index for evaluating the structure of an object or the correlation similarity index in units of pixels, the third feature map generating unit 33 can increase the accuracy of object detection in a captured image using the third feature map FM3. Note that the object detection unit 24 detects an object in the captured image using the third feature map FM3.

In a case where the third feature map generating unit 33 does not adopt <Generation Method by Addition (2)> or <Generation Method by Multiplication (2)> in generating the third feature map FM3, the first feature amount extracting unit 22 can be configured not to include the fourth feature map generating unit 36.

As described above, the individual first feature amount and the individual fourth feature amount use the mid-level feature corresponding to objectness. Therefore, weighting is performed by <Generation Method by Addition (1)>, <Generation Method by Multiplication (1)>, <Generation Method by Addition (2)>, or <Generation Method by Multiplication (2)>, and thus the individual second feature amount is reinforced in accordance with the corresponding objectness. That is, the second feature amount corresponding to higher objectness is relatively made stronger than the second feature amount corresponding to lower objectness. On the other hand, the second feature amount corresponding to lower objectness is relatively made weaker than the second feature amount corresponding to higher objectness. The individual third feature maps FM3 are based on a plurality of feature amounts (hereinafter, sometimes referred to as "third feature amounts") subjected to such reinforcement.

In addition, as weighting is performed by <Generation Method by Addition (3), the number of dimensions is increased while the spatial resolution of the second feature map FM2 is completely maintained and the individual pieces of layer information remain independent. Each of the third feature maps FM3 is obtained by reinforcing a plurality of feature amounts (first feature amounts) in the dimensional direction while the spatial independence of the individual second feature amounts in the second feature map FM2 is maintained, and is based on the individual second feature amounts and the individual first feature amounts. The individual second feature amounts and the individual first feature amounts constituting the individual third feature maps FM3 generated by <Generation Method by Addition (3)> may be hereinafter referred to as "third feature amounts".

Regarding the generation of the third feature map FM3 by <Generation Method by Addition (1)>, <Generation Method by Multiplication (1)>, <Generation Method by Addition (2)>, <Generation Method by Multiplication (2)>, and <Generation Method by Addition (3)>, images thereof will be described later with reference to FIGS. 13 to 21.

The first neural network NN1 can be trained by supervised training. That is, the second feature amount extracting unit 23 can be trained by supervised training. Here, as described above, the first neural network NN1 includes the CNN. That is, the second feature amount extracting unit 23 includes the CNN. Therefore, the second feature amount extracting unit 23 can be trained by deep learning. The structure of the first neural network NN1 will be described later with reference to FIGS. 11 to 12.

When each of the second feature maps FM2 is generated by the second feature map generating unit 32, the feature-map storage unit 11 temporarily stores the generated second feature map FM2. Since the feature-map storage unit 11 is provided outside the second feature amount extracting unit 23, the use efficiency of the storage capacity can be improved.

The object detection unit 24 detects an individual object in an individual captured image using the plurality of third feature maps FM3 generated by the third feature map generating unit 33. More specifically, the position estimation unit 34 estimates the position of each object by regression, and the type estimation unit 35 estimates the type of each object by classification. That is, the second neural network NN2 can be trained by supervised training. In other words, the object detection unit 24 can be trained by supervised training.

Specifically, for example, the object detection unit 24 detects an individual object by SSD. That is, the second neural network NN2 is configured by a neural network similar to a neural network at the subsequent stage of "VGG-16" in the SSD described in Non-Patent Literature 1 (see FIG. 2 and the like in Non-Patent Literature 1). That is, the second neural network NN2 is configured by a neural network including a neural network similar to "Extra Feature Layers" in the SSD described in Non-Patent Literature 1. The convolution operation is performed a plurality of times by the neural network. As a result, the position of each object is estimated, and the type of each object is estimated.

Here, such a plurality of convolution operations are based on kernel sizes different from each other. More specifically, the kernel size gradually decreases. As a result, it is possible to cope with variations in the size of individual objects in a captured image. That is, so-called "multiscale" object detection can be achieved.

FIG. 3 illustrates an example of types estimated by the type estimation unit 35. That is, FIG. 3 illustrates an example of classes estimated by the type estimation unit 35.

In the drawing, "cars (same direction)" indicates cars traveling in the same direction as the traveling direction of the host vehicle. In the drawing, "large vehicles (same direction)" indicates large vehicles traveling in the same direction as the traveling direction of the host vehicle. In the drawing, "motorbikes (same direction)" indicates motorbikes traveling in the same direction as the traveling direction of the host vehicle. That is, these classes indicate other vehicles traveling in the same direction as the traveling direction of the host vehicle. In other words, these classes indicate following vehicles or passing vehicles.

In the drawing, "cars (opposite direction)" indicates cars traveling in the opposite direction to the traveling direction of the host vehicle. In the drawing, "large vehicles (opposite direction)" indicates large vehicles traveling in the opposite direction to the traveling direction of the host vehicle. In the drawing, "motorbikes (opposite direction)" indicates motorbikes traveling in the opposite direction to the traveling direction of the host vehicle. That is, these classes indicate other vehicles traveling in the opposite direction to the traveling direction of the host vehicle. In other words, these classes indicate oncoming vehicles.

As described above, the class classified by the type estimation unit 35 includes the traveling direction of each object. That is, the type classified by the type estimation unit 35 includes the traveling direction of each object. As a result, the determination of the traveling direction can be made unnecessary in the subsequent processing performed by the object detection unit 24. As a result, it is possible to reduce the amount of calculation in the subsequent processing performed by the object detection unit 24.

Figure 4:
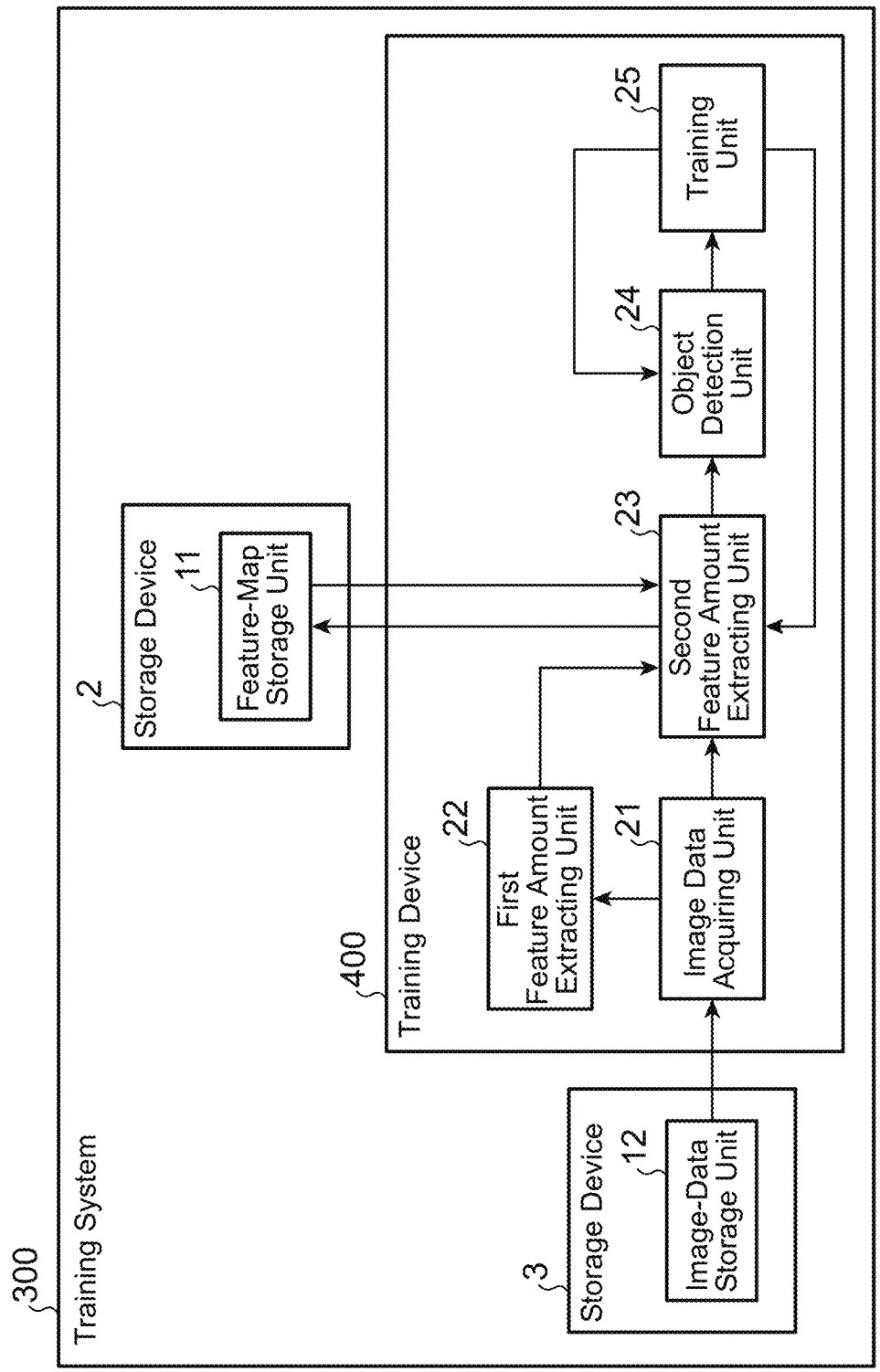
FIG. 4 is a block diagram illustrating the main part of a training system including a training device according to the first embodiment.

FIG. 4 is a block diagram illustrating the main part of a training system including a training device according to the first embodiment. The training system including the training device according to the first embodiment will be described with reference to FIG. 4. Note that, in FIG. 4, the same reference numerals are given to blocks similar to those illustrated in FIG. 1, and the description thereof will be omitted.

As illustrated in FIG. 4, a training system 300 includes the storage device 2, a storage device 3, and a training device 400. The storage device 2 includes the feature-map storage unit 11. The storage device 3 includes an image-data storage unit 12. The training device 400 includes the image data acquiring unit 21, the first feature amount extracting unit 22, the second feature amount extracting unit 23, the object detection unit 24, and a training unit 25. The storage device 3 includes a memory.

The image-data storage unit 12 stores a database (hereinafter, referred to as "training image database") including a plurality of training images (hereinafter, sometimes referred to as "training images"). The image data acquiring unit 21 in the training device 400 acquires image data indicating individual training images instead of acquiring image data indicating individual captured images.

The first feature amount extracting unit 22, the second feature amount extracting unit 23, and the object detection unit 24 in the training device 400 are similar to the first feature amount extracting unit 22, the second feature amount extracting unit 23, and the object detection unit 24 in the object detection device 200, respectively. Consequently, the detailed description thereof will be omitted.

The training unit 25 trains the second feature amount extracting unit 23 by supervised training (more specifically, deep learning) on the basis of the detection result of the object detection unit 24. In addition, the training unit 25 trains the object detection unit 24 by supervised training on the basis of the detection result of the object detection unit 24.

That is, the training unit 25 acquires data (hereinafter, referred to as "correct answer data") indicating correct answers of object detection corresponding to the training images indicated by the image data acquired by the image data acquiring unit 21. The correct answer data is input in advance by a person (for example, a manufacturer of the object detection device 200 or a provider of services using the object detection system 100). The training unit 25 compares the detection result of the object detection unit 24 with the correct answer indicated by the acquired correct answer data. The training unit 25 updates the parameters in the first neural network NN1 as necessary and also updates the parameters in the second neural network NN2 as necessary on the basis of the comparison result. Various known techniques can be used to update such parameters. Detailed description of these techniques will be omitted.

That is, the training unit 25 generates a trained model (hereinafter, referred to as "machine learning model") that receives the image data acquired by the image data acquiring unit 21 as input and outputs a detection result of an individual object in an individual captured image. A plurality of parameter sets are set in the machine learning model. Each parameter set includes a trained parameter for the first neural network NN1 and a trained parameter for the second neural network NN2.

Note that the detection result of the individual object in the individual captured image is specifically the estimation result of the position of the individual object in the individual captured image and the estimation result of the type of the individual object. The machine learning model is stored in, for example, a storage device (not illustrated).

Hereinafter, the function of the image data acquiring unit 21 may be denoted by reference sign "F1". Furthermore, the function of the first feature amount extracting unit 22 may be denoted by reference sign "F2". Further, the function of the second feature amount extracting unit 23 may be denoted by reference sign "F3". Moreover, the function of the object detection unit 24 may be denoted by reference sign "F4". Furthermore, the function of the training unit 25 may be denoted by reference sign "F5".

Hereinafter, the process performed by the image data acquiring unit 21 may be collectively referred to as "image data acquiring process". Furthermore, the process performed by the first feature amount extracting unit 22 may be collectively referred to as "first feature amount extracting process". Further, the process performed by the second feature amount extracting unit 23 may be collectively referred to as "second feature amount extracting process". Moreover, the process performed by the object detection unit 24 may be collectively referred to as "object detection process". Furthermore, the process performed by the training unit 25 may be collectively referred to as "training process".

Next, a hardware configuration of the main part of the object detection device 200 will be described with reference to FIGS. 5 and 6.

Figure 5:
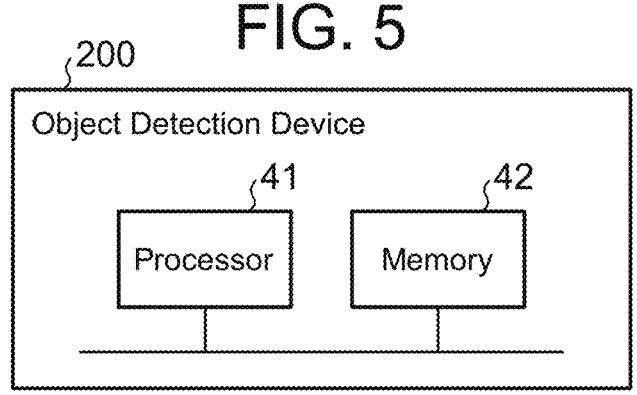
FIG. 5 is a block diagram illustrating a hardware configuration of the main part of the object detection device according to the first embodiment.

As illustrated in FIG. 5, the object detection device 200 includes a processor 41 and a memory 42. The memory 42 stores programs corresponding to the plurality of functions F1 to F4. The processor 41 reads and executes the programs stored in the memory 42. As a result, the plurality of functions F1 to F4 are implemented.

Figure 6:
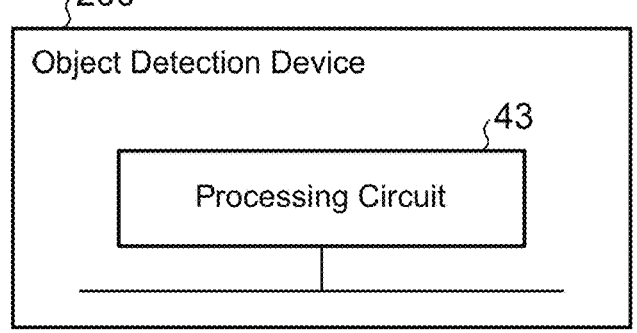
FIG. 6 is a block diagram illustrating another hardware configuration of the main part of the object detection device according to the first embodiment.

Alternatively, as illustrated in FIG. 6, the object detection device 200 includes a processing circuit 43. In this case, the plurality of functions F1 to F4 are implemented by the dedicated processing circuit 43.

Alternatively, the object detection device 200 includes the processor 41, the memory 42, and the processing circuit 43 (not illustrated). In this case, some of the functions F1 to F4 are implemented by the processor 41 and the memory 42, and the remaining functions of the functions F1 to F4 are implemented by the dedicated processing circuit 43.

The processor 41 includes one or more processors. Each processor uses, for example, a central processing unit (CPU), a graphics processing unit (GPU), a microprocessor, a microcontroller, or a digital signal processor (DSP).

The memory 42 includes one or more nonvolatile memories. Alternatively, the memory 42 includes one or more nonvolatile memories and one or more volatile memories. That is, the memory 42 includes one or more memories. Each memory uses, for example, a semiconductor memory, a magnetic disk, an optical disk, a magneto-optical disk, or a magnetic tape.

More specifically, each volatile memory uses, for example, a random access memory (RAM). In addition, each nonvolatile memory uses, for example, a read only memory (ROM), a flash memory, an erasable programmable read only memory (EPROM), an electrically erasable programmable read only memory (EEPROM), a solid state drive, a hard disk drive, a flexible disk, a compact disk, a digital versatile disc (DVD), a Blu-ray disk, or a mini disk.

The processing circuit 43 includes one or more digital circuits. Alternatively, the processing circuit 43 includes one or more digital circuits and one or more analog circuits. That is, the processing circuit 43 includes one or more processing circuits. Each processing circuit uses, for example, an application specific integrated circuit (ASIC), a programmable logic device (PLD), a field programmable gate array (FPGA), a system on a chip (SoC), or a system large scale integration (LSI).

Here, when the processing circuit 43 includes a plurality of processing circuits, the correspondence relationship between the plurality of functions F1 to F4 and the plurality of processing circuits is freely determined. For example, the object detection device 200 may include a plurality of processing circuits corresponding to the plurality of functions F1 to F4 on a one-to-one basis. In this case, each of the plurality of functions F1 to F4 may be implemented exclusively by a corresponding one of the plurality of processing circuits.

Next, a hardware configuration of the main part of the training device 400 will be described with reference to FIGS. 7 and 8.

Figure 7:
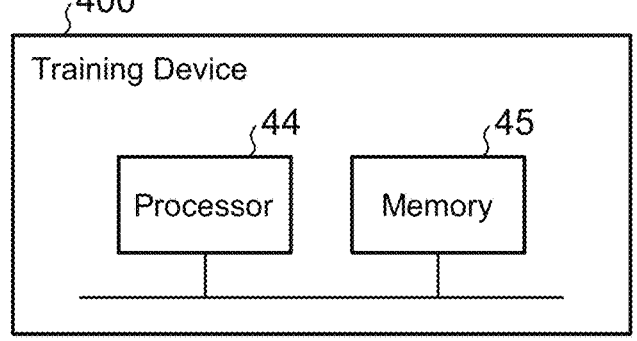
FIG. 7 is a block diagram illustrating a hardware configuration of the main part of the training device according to the first embodiment.

As illustrated in FIG. 7, the training device 400 includes a processor 44 and a memory 45. The memory 45 stores programs corresponding to the plurality of functions F1 to F5. The processor 44 reads and executes the programs stored in the memory 45. As a result, the plurality of functions F1 to F5 are implemented.

Figure 8:
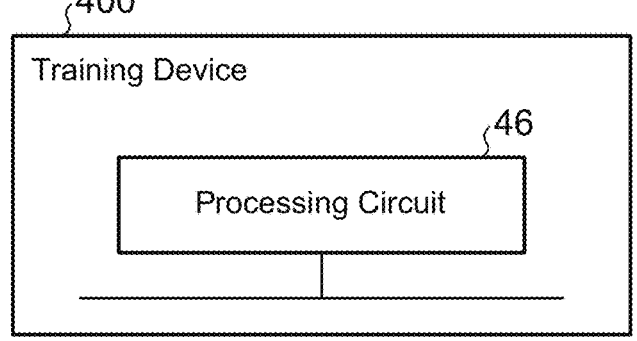
FIG. 8 is a block diagram illustrating another hardware configuration of the main part of the training device according to the first embodiment.

Alternatively, as illustrated in FIG. 8, the training device 400 includes a processing circuit 46. In this case, the plurality of functions F1 to F5 are implemented by the dedicated processing circuit 46.

Alternatively, the training device 400 includes the processor 44, the memory 45, and the processing circuit 46 (not illustrated). In this case, some of the functions F1 to F5 are implemented by the processor 44 and the memory 45, and the remaining functions of the functions F1 to F5 are implemented by the dedicated processing circuit 46.

The processor 44 includes one or more processors. Each processor uses, for example, a CPU, a GPU, a microprocessor, a microcontroller, or a DSP.

The memory 45 includes one or more nonvolatile memories. Alternatively, the memory 45 includes one or more nonvolatile memories and one or more volatile memories. That is, the memory 45 includes one or more memories. Each memory uses, for example, a semiconductor memory, a magnetic disk, an optical disk, a magneto-optical disk, or a magnetic tape.

More specifically, each volatile memory uses, for example, a RAM. In addition, each nonvolatile memory uses, for example, a ROM, a flash memory, an EPROM, an EEPROM, a solid state drive, a hard disk drive, a flexible disk, a compact disk, a DVD, a Blu-ray disk, or a mini disk.

The processing circuit 46 includes one or more digital circuits. Alternatively, the processing circuit 46 includes one or more digital circuits and one or more analog circuits. That is, the processing circuit 46 includes one or more processing circuits. Each processing circuit uses, for example, an ASIC, a PLD, an FPGA, an SoC, or a system LSI.

Here, when the processing circuit 46 includes a plurality of processing circuits, the correspondence relationship between the plurality of functions F1 to F5 and the plurality of processing circuits is freely determined. For example, the training device 400 may include a plurality of processing circuits corresponding to the plurality of functions F1 to F5 on a one-to-one basis. In this case, each of the plurality of functions F1 to F5 may be implemented exclusively by a corresponding one of the plurality of processing circuits.

Figure 9:
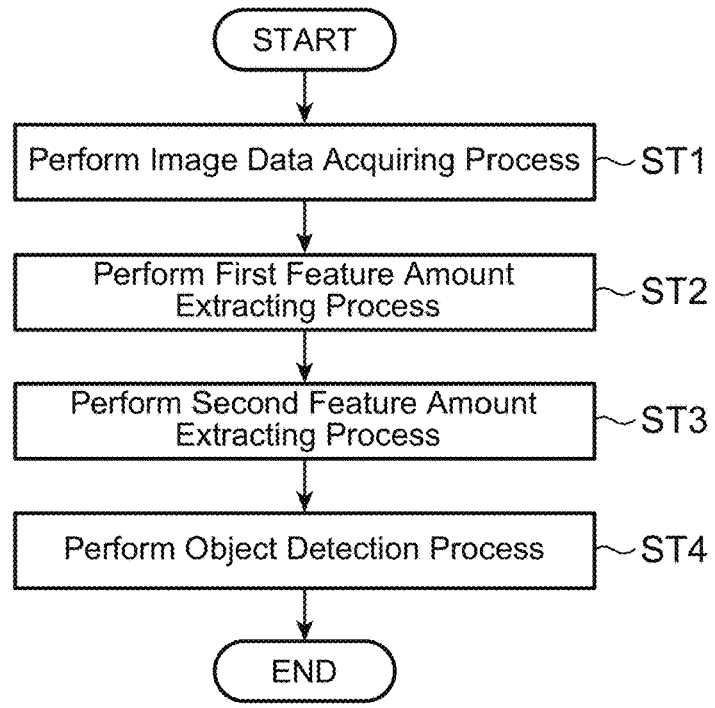
FIG. 9 is a flowchart illustrating an operation of the object detection device according to the first embodiment.

Next, an operation of the object detection device 200 will be described with reference to the flowchart of FIG. 9.

First, the image data acquiring unit 21 performs the image data acquiring process (step ST1). Next, the first feature amount extracting unit 22 performs the first feature amount extracting process (step ST2). Next, the second feature amount extracting unit 23 performs the second feature amount extracting process (step ST3). Next, the object detection unit 24 performs the object detection process (step ST4).

Next, an operation of the training device 400 will be described with reference to the flowchart of FIG. 10.

First, the image data acquiring unit 21 performs the image data acquiring process (step ST11). Next, the first feature amount extracting unit 22 performs the first feature amount extracting process (step ST12). Next, the second feature amount extracting unit 23 performs the second feature amount extracting process (step ST13). Next, the object detection unit 24 performs the object detection process (step ST14). Next, the training unit 25 performs the training process (step ST15).

Next, the structure of the first neural network NN1 will be described with reference to FIGS. 11 to 12.

Figure 11:
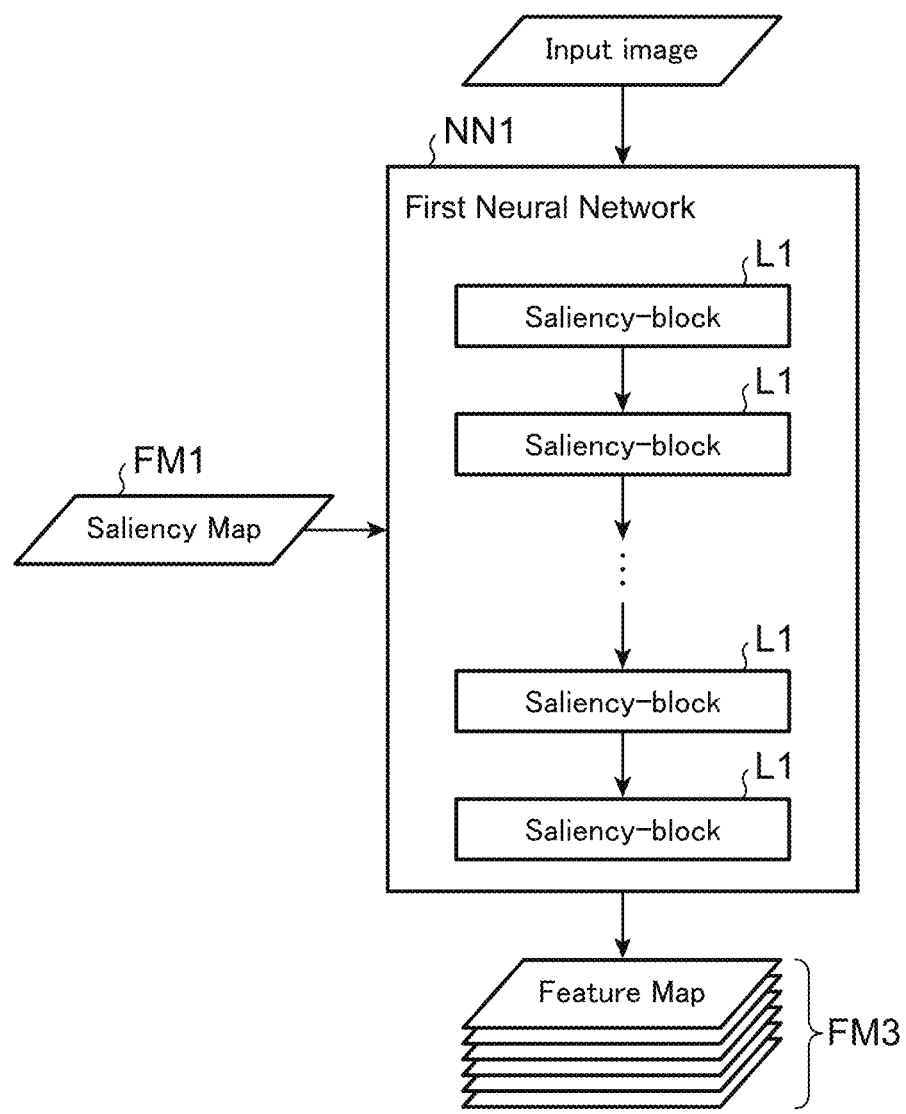
FIG. 11 is an explanatory diagram illustrating a structure of a first neural network.

As illustrated in FIG. 11, the first neural network NN1 includes a plurality of saliency block layers L1. In the drawing, "Input image" indicates a captured image or a training image indicated by the image data acquired by the image data acquiring unit 21. In the drawing, "Saliency Map" indicates the first feature map FM1 generated by the first feature map generating unit 31. In the drawing, "Feature Map" indicates the individual third feature map FM3 generated by the third feature map generating unit 33.

Figure 12:
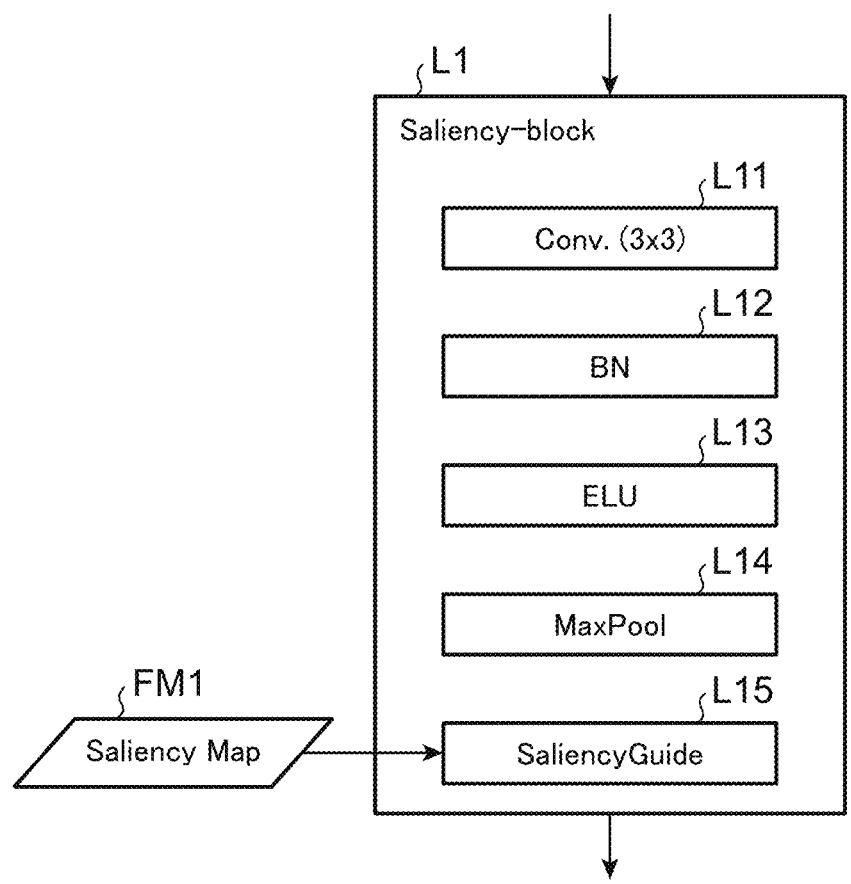
FIG. 12 is an explanatory diagram illustrating a structure of each saliency block layer.

As illustrated in FIG. 12, each saliency block layer L1 includes a 3×3 convolution layer L11, a batch normalization (BN) layer L12, an exponential linear unit (ELU) layer L13, a maximum pooling layer L14, and a saliency guide layer L15.

The CNN in the first neural network NN1 uses, for example, a VGG network. The VGG network may be a VGG network to which BN is added. It is not limited thereto, and the CNN in the first neural network NN1 may use, for example, a residual network, or may use DenseNet or MobileNet. Furthermore, the CNN in the first neural network NN1 may use, for example, the technique described in Reference Literature 2 below.

REFERENCE LITERATURE 2

Mingxing Tan, Quoc Le, "EfficientNet: Rethinking Model Scaling for Convolutional Neural Networks" Proceedings of the 36th International Conference on Machine Learning, PMLR 97:6105-6114, 2019, http://proceedings.mlr.press/v97/tan19a/tan19a.pdf By using the first neural network NN1 with the structure illustrated in FIG. 11, the corresponding second feature map FM2 of the plurality of second feature maps FM2 is generated in the saliency block layer L1, and the generated second feature map FM2 is weighted. That is, addition or multiplication using the first feature map FM1 is performed on each of the second feature maps FM2, and weighting is performed on each of the second feature maps FM2 by the first feature map FM1.

Here, FIGS. 13 to 21 are diagrams for describing a concept in which weighting is performed on each of the second feature maps FM2 in the saliency block layer L1 and the third feature map FM3 is generated.

Note that, in FIGS. 13 to 21, "Input image" indicates a captured image or a training image indicated by the image data acquired by the image data acquiring unit 21. In the first embodiment, as described above, the camera 1 includes an electronic mirror camera and is provided in a vehicle, but in FIGS. 13 to 21, for convenience, the image data acquired by the image data acquiring unit 21 is, for example, image data captured by the camera 1 including a monitoring camera that captures an image of the coast. In the drawings, "Saliency Map" indicates the first feature map FM1 generated by the first feature map generating unit 31. In the drawings, "Feature Map" indicates each of the second feature maps FM2 generated by the second feature map generating unit 32, each of the third feature maps FM3 generated by the third feature map generating unit 33, or each of the fourth feature maps FM4 generated by the fourth feature map generating unit 36.

Figure 13:
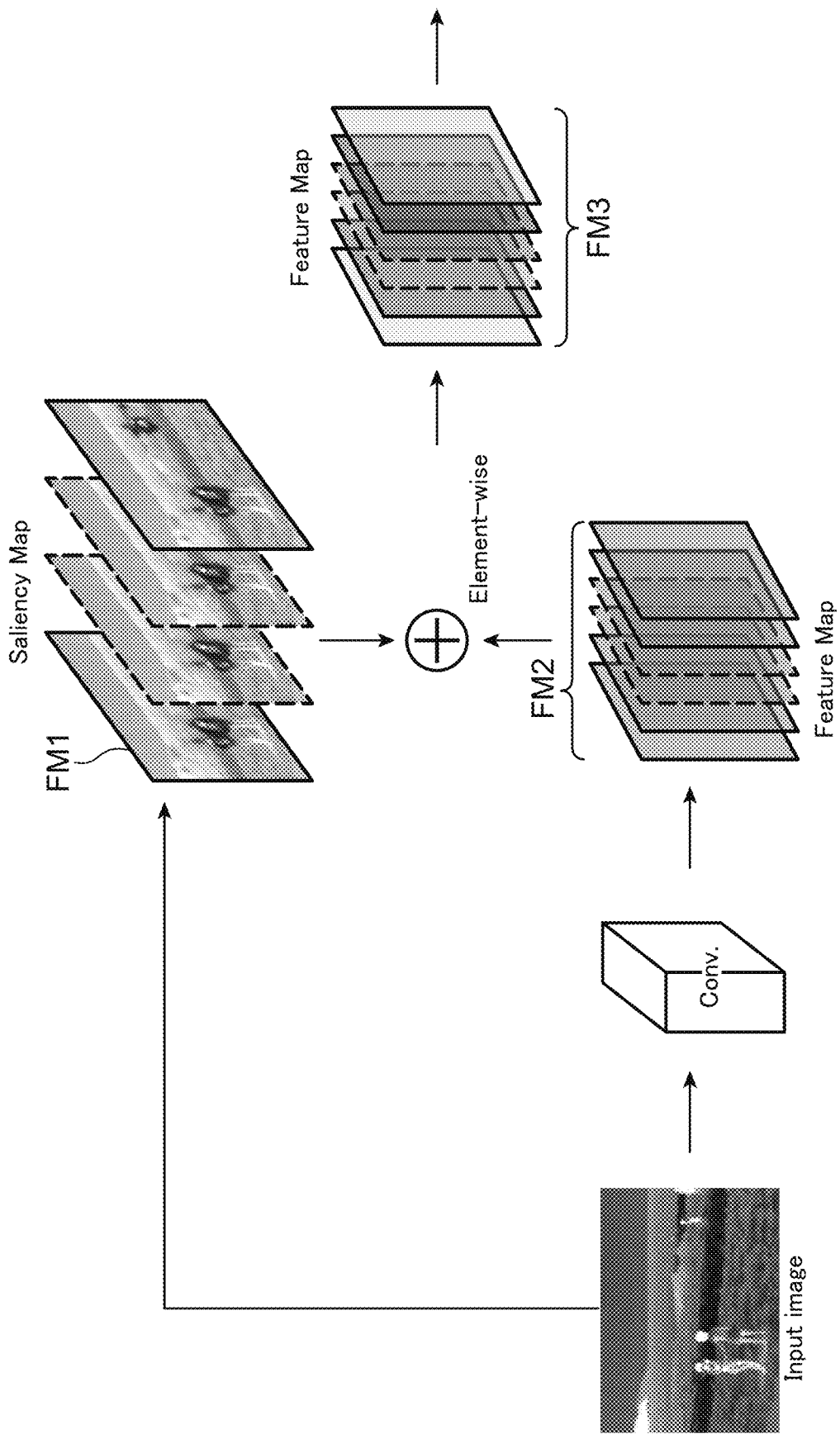
FIG. 13 is a diagram for describing a concept in which weighting is performed on individual second feature maps in a saliency block layer and a third feature map is generated.

FIG. 13 is a diagram for describing a concept in which the third feature map FM3 is generated using <Generation Method by Addition (1)> described above.

Figure 14:
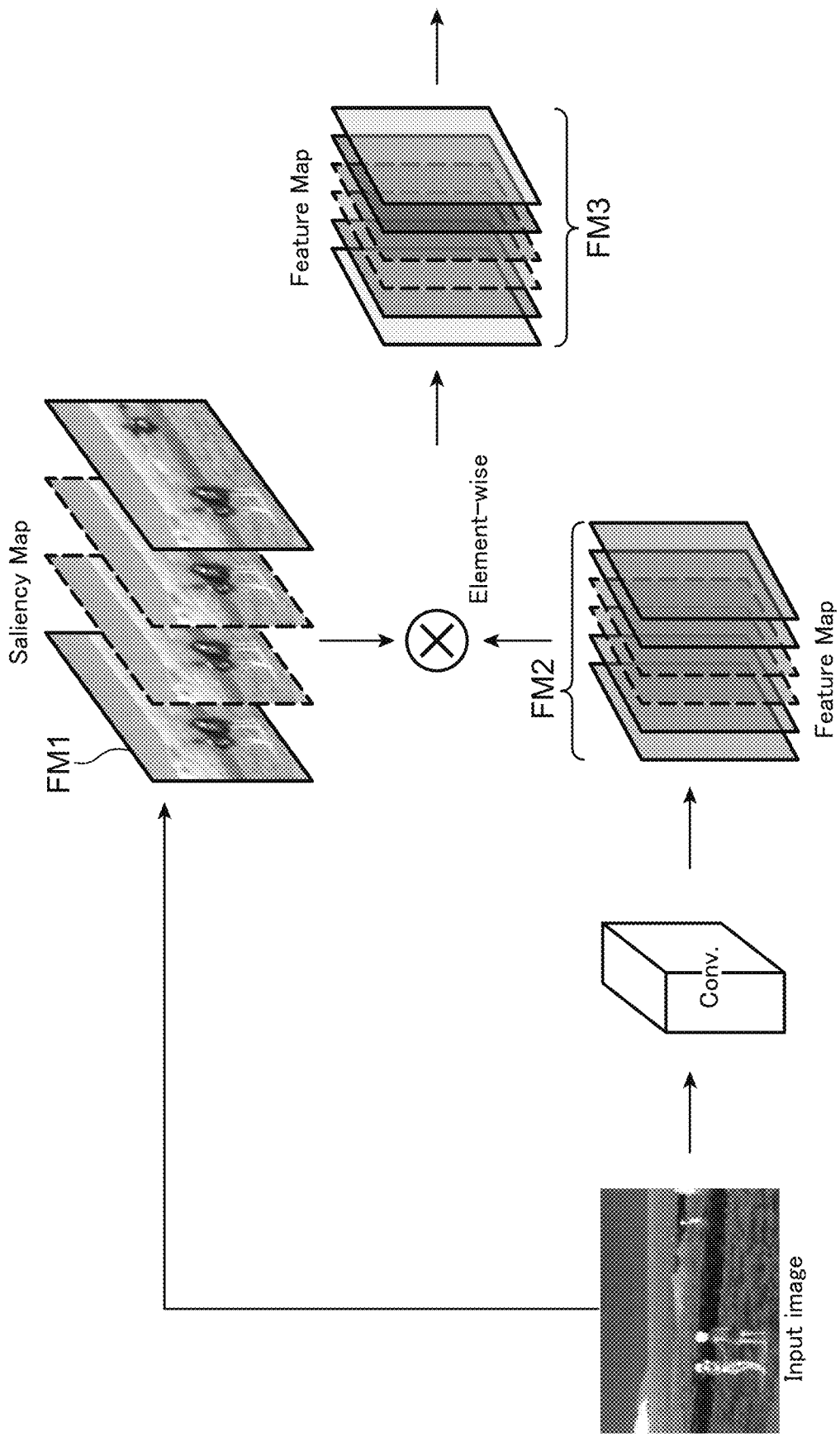
FIG. 14 is a diagram for describing another concept in which weighting is performed on individual second feature maps in the saliency block layer and the third feature map is generated.

FIG. 14 is a diagram for describing a concept in which the third feature map FM3 is generated using <Generation Method by Multiplication (1)> described above.

FIGS. 13 and 14 illustrate a concept in which, for example, only in the first saliency block layer L1, the corresponding second feature map FM2 of the plurality of second feature maps FM2 is generated using the first feature map FM1, the generated second feature map FM2 is weighted, and the third feature map FM3 is generated.

As illustrated in FIGS. 13 and 14, in each of the first feature maps FM1, an area corresponding to an object (here, a person) to be detected is activated. A large value is set to the first feature amount of the activated area on the first feature map FM1. Note that, in the first feature map FM1, an area corresponding to a small and distant object is also activated.

For example, a small and distant object is not detected on the second feature map FM2 and becomes a background. However, as illustrated in FIGS. 13 and 14, by adding or multiplying the second feature map FM2 and the first feature map FM1 and spatially adding or multiplying the first feature amount and the second feature amount, weighting is performed and the importance W is set. As a result, the second feature map FM2 becomes a feature map in which a small object can be detected instead of not being detected and becoming the background.

In addition, even in the case of information that is meaningless, unnecessary, or redundant in object detection, the information may appear as a feature amount on the second feature map FM2. The feature amount is a meaningless, unnecessary, or redundant feature amount, and is information that hinders training. As a specific example, for example, in a case where it is desired to train a foreground object such as a person or a vehicle but a large number of background objects such as the sea or a building are included, in machine learning, a large number of background patterns may be trained and training of the foreground object may be hindered.

On the other hand, for example, as illustrated in FIG. 14, the second feature map FM2 is multiplied by the first feature map FM1, and the first feature amount is spatially multiplied by the second feature amount, so that the redundant second feature amount is discarded. Note that, for example, "0" is set to the first feature amount that is meaningless in object detection on the first feature map FM1. As "0" is multiplied, the second feature amount becomes "0". As a result, it is possible to prevent the training of the foreground object from being hindered.

Figure 15:
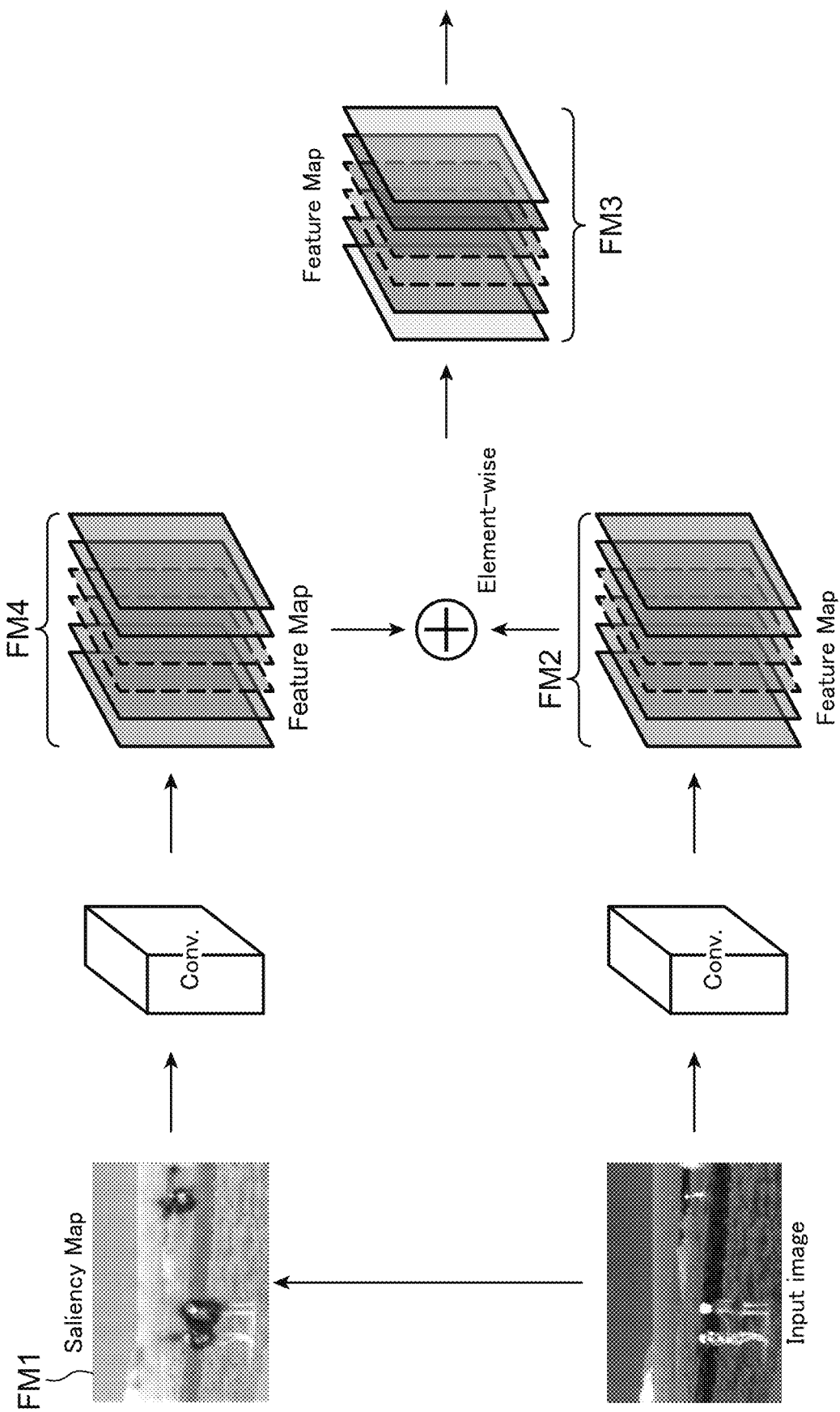
FIG. 15 is a diagram for describing still another concept in which weighting is performed on individual second feature maps in the saliency block layer and the third feature map is generated.

FIG. 15 is a diagram for describing a concept in which the third feature map FM3 is generated using <Generation Method by Addition (2)> described above.

Figure 16:
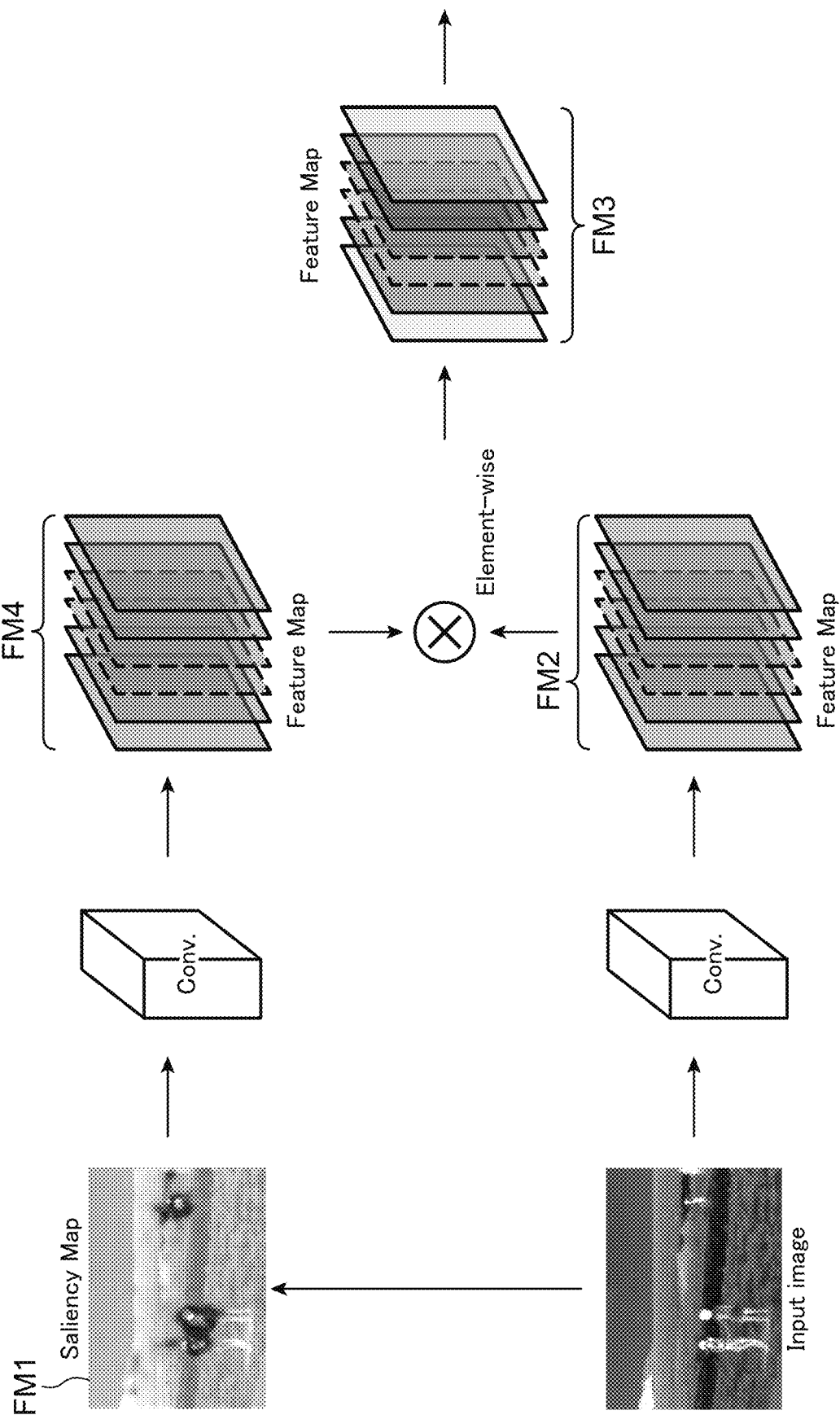
FIG. 16 is a diagram for describing yet another concept in which weighting is performed on individual second feature maps in the saliency block layer and the third feature map is generated.

FIG. 16 is a diagram for describing a concept in which the third feature map FM3 is generated using <Generation Method by Multiplication (2)> described above.

FIGS. 15 and 16 illustrate a concept in which, for example, only in the first saliency block layer L1, the corresponding second feature map FM2 of the plurality of second feature maps FM2 is generated using the first feature map FM1, the generated second feature map FM2 is weighted, and the third feature map FM3 is generated.

As illustrated in FIGS. 15 and 16, in the first feature map FM1, an area corresponding to an object (here, a person) to be detected is activated. A plurality of fourth feature maps FM4 are generated from the first feature map FM1. Since the plurality of fourth feature maps FM4 are generated by convolution, the plurality of fourth feature maps FM4 are feature maps having different feature amount acquiring methods. Note that the operation content of the convolution performed by the fourth feature map generating unit 36 to generate the plurality of fourth feature maps FM4 is the same as the operation content of the convolution performed by the second feature amount extracting unit 23 to generate the plurality of second feature maps FM2.

For example, as illustrated in FIG. 15, by adding the individual fourth feature amounts in the individual fourth feature maps FM4 to the corresponding second feature amounts in the corresponding second feature maps FM2, addition is performed with a combination of feature amounts having different variations. As a result, more advanced spatial addition can be implemented as compared with <Generation Method by Addition (1)> in which, as illustrated in FIG. 13, one first feature map FM1 is duplicated and added to each of the second feature maps FM2.

In addition, for example, as illustrated in FIG. 16, by multiplying the individual fourth feature amounts in the individual fourth feature maps FM4 by the corresponding second feature amounts in the corresponding second feature maps FM2, multiplication is performed with a combination of feature amounts having different variations. As a result, more advanced spatial addition can be implemented as compared with <Generation Method by Multiplication (2)> in which, as illustrated in FIG. 14, one first feature map FM1 is duplicated and multiplied by each of the second feature maps FM2.

As described above, FIGS. 13 to 16 illustrate images in which the third feature map FM3 is generated using <Generation Method by Addition (1)>, <Generation Method by Multiplication (1)>, <Generation Method by Addition (2)>, and <Generation Method by Multiplication (2)> only in the first saliency block layer L1 of the individual saliency block layers L1.

It is not limited thereto, and the third feature map FM3 may be generated, for example, in each saliency block layer L1 using <Generation Method by Addition (1)>, <Generation Method by Multiplication (1)>, <Generation Method by Addition (2)>, or <Generation Method by Multiplication (2)>.

Figure 17:
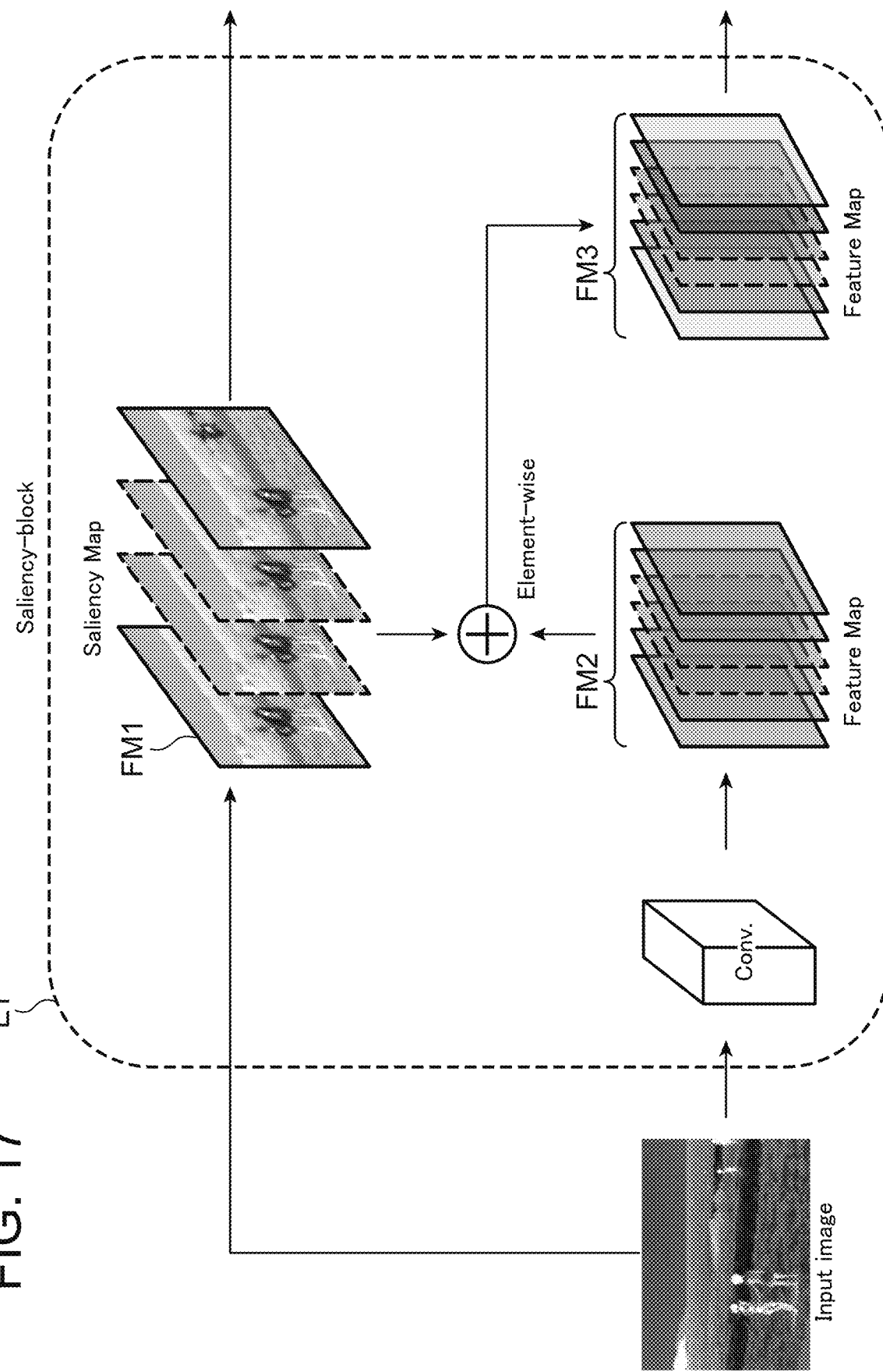
FIG. 17 is a diagram for describing further concept in which weighting is performed on individual second feature maps in the saliency block layer and the third feature map is generated.

FIG. 17 is a diagram for describing a concept in which the third feature map FM3 is generated using <Generation Method by Addition (1)> described above in each saliency block layer L1. In each saliency block layer L1, the third feature map FM3 is generated as illustrated in an image of FIG. 17.

Figure 18:
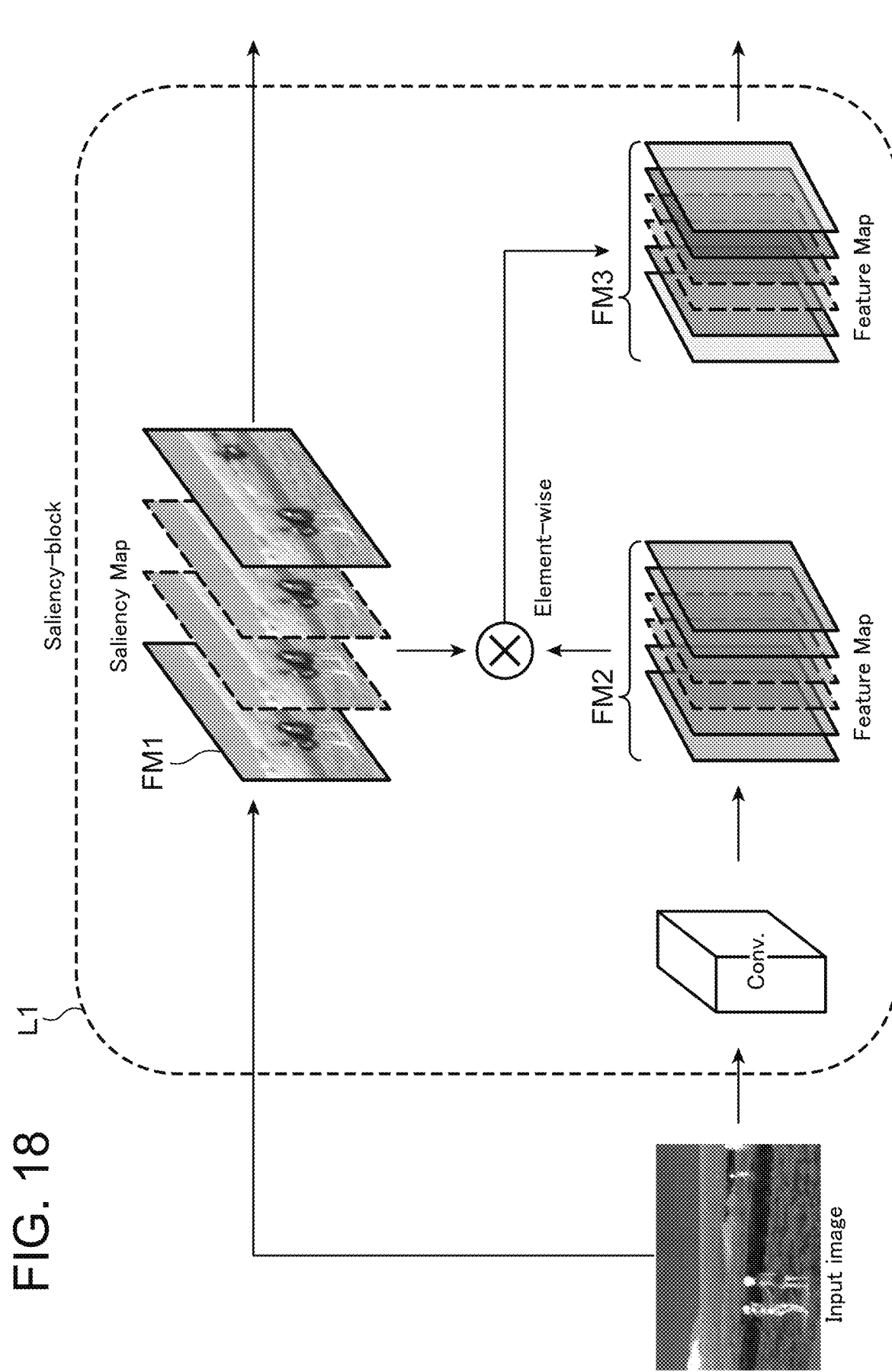
FIG. 18 is a diagram for describing still further concept in which weighting is performed on individual second feature maps in the saliency block layer and the third feature map is generated.

FIG. 18 is a diagram for describing a concept in which the third feature map FM3 is generated using <Generation Method by Multiplication (1)> described above in each saliency block layer L1. In each saliency block layer L1, the third feature map FM3 is generated as illustrated in an image of FIG. 18.

Figure 19:
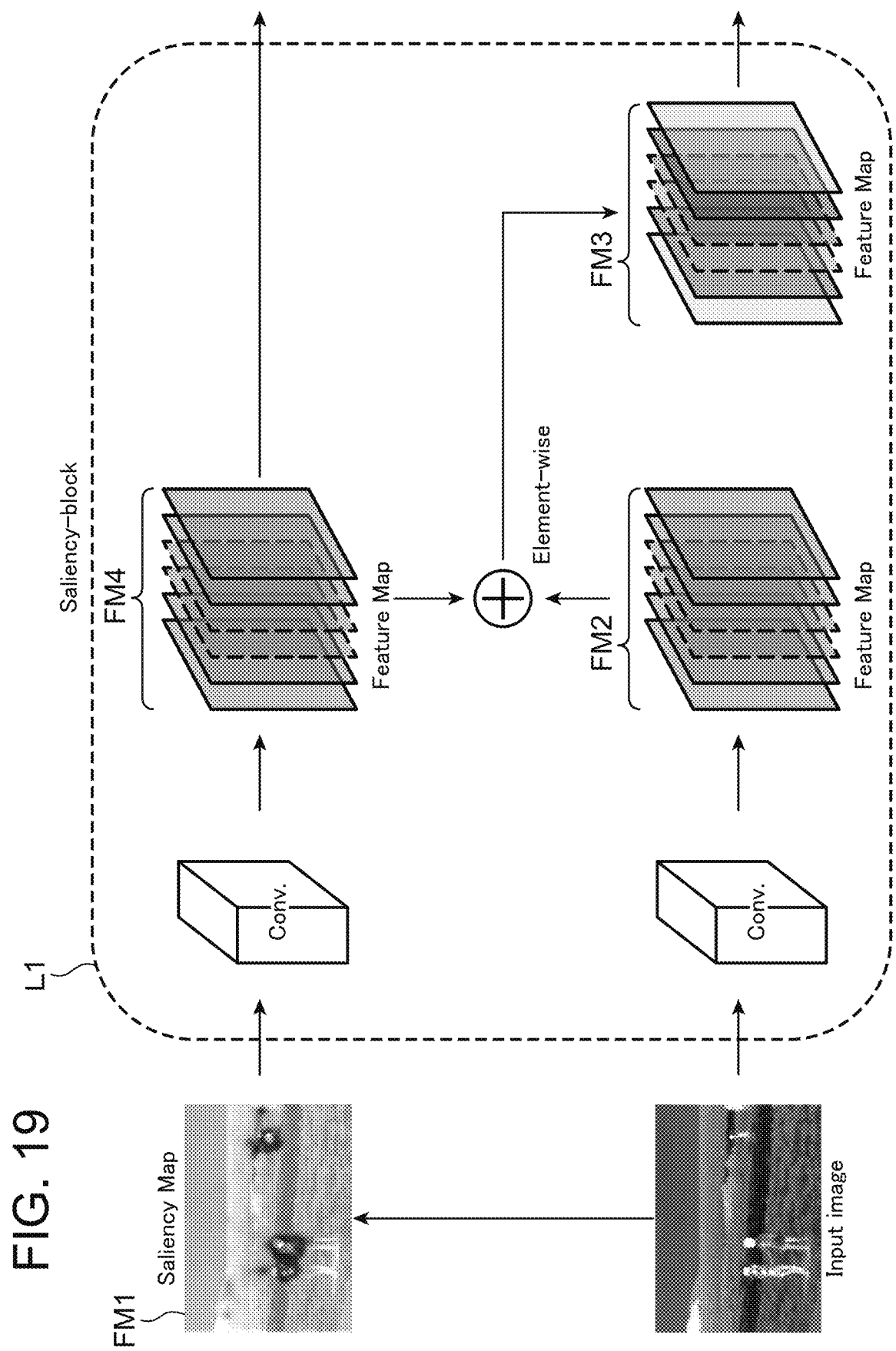
FIG. 19 is a diagram for describing yet further concept in which weighting is performed on individual second feature maps in the saliency block layer and the third feature map is generated.

FIG. 19 is a diagram for describing a concept in which the third feature map FM3 is generated using <Generation Method by Addition (2)> described above in each saliency block layer L1. In each saliency block layer L1, the third feature map FM3 is generated as illustrated in an image of FIG. 19.

Figure 20:
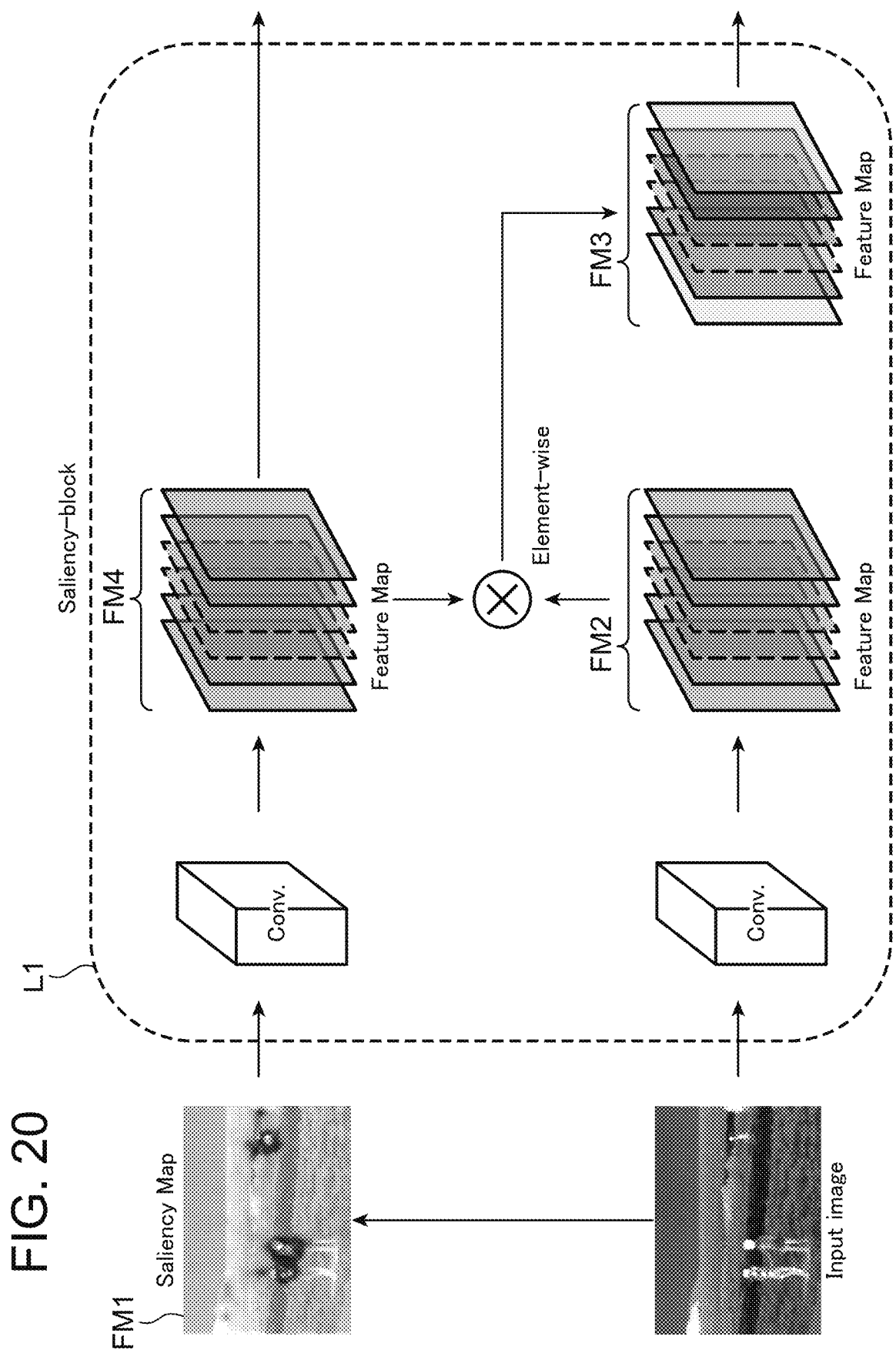
FIG. 20 is a diagram for describing yet further concept in which weighting is performed on individual second feature maps in the saliency block layer and the third feature map is generated.

FIG. 20 is a diagram for describing a concept in which the third feature map FM3 is generated using <Generation Method by Multiplication (2)> described above in each saliency block layer L1. In each saliency block layer L1, the third feature map FM3 is generated as illustrated in an image of FIG. 20.

Figure 21:
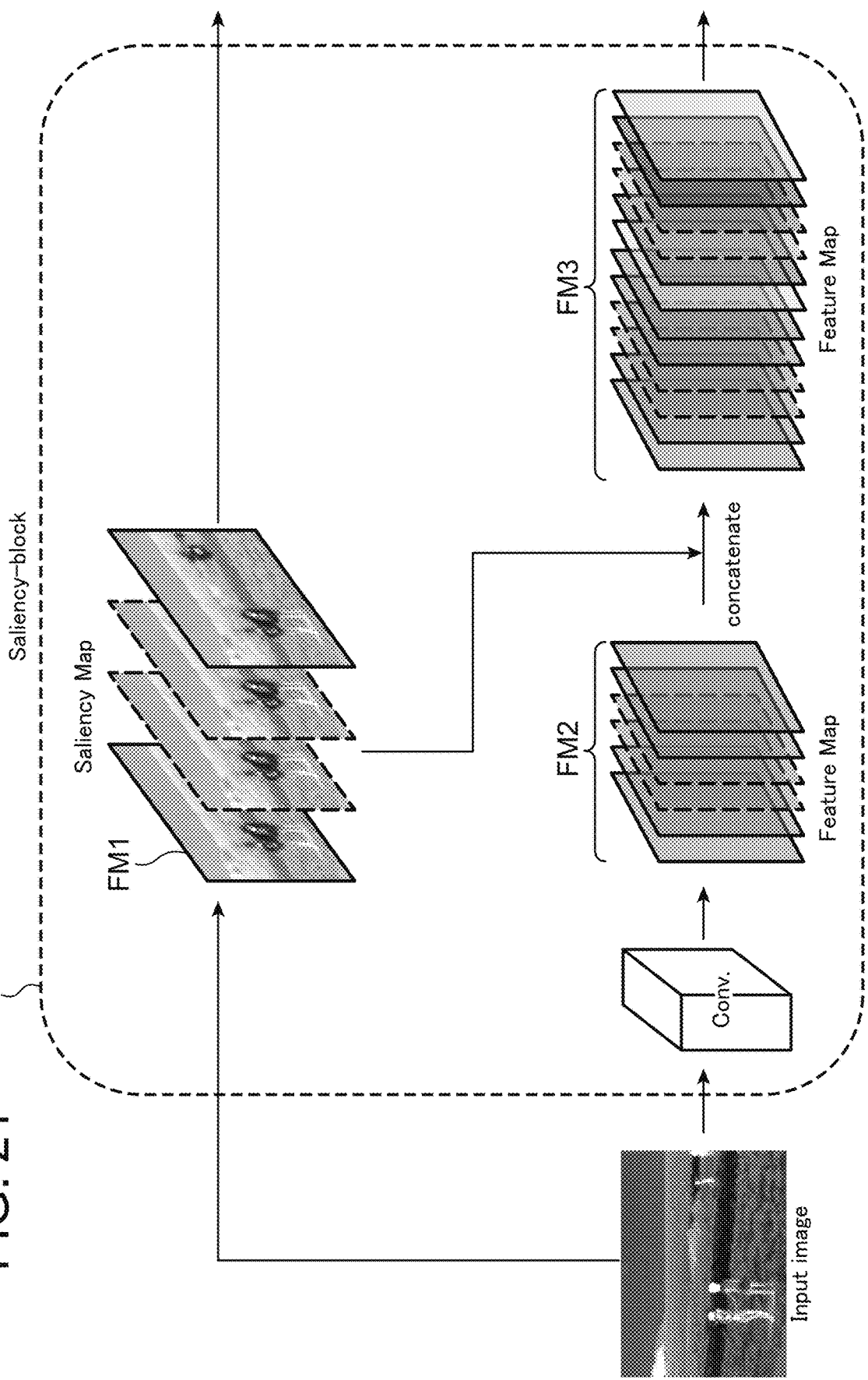
FIG. 21 is a diagram for describing yet further concept in which weighting is performed on individual second feature maps in the saliency block layer and the third feature map is generated.

FIG. 21 is a diagram for describing a concept in which the third feature map FM3 is generated using <Generation Method by Addition (3)> described above.

Note that FIG. 21 is a diagram for describing a concept in which the third feature map FM3 is generated using <Generation Method by Addition (3)> described above in each saliency block layer L1.

The individual first feature maps FM1 in which the area corresponding to the object to be detected (here, a person) is activated are added after the plurality of second feature maps FM2 in the dimensional direction.

<Generation Method by Addition (3)> is a method for weighting the second feature map FM2 by increasing the variation of the feature map, instead of spatially adding the first feature amount to the second feature amount.

For example, it is assumed that the first feature map FM1 and the second feature map FM2 are 500 dimensional feature maps. In this case, for example, in <Generation Method by Addition (1)> described above, the generated third feature map FM3 is a 500 dimensional feature map, and the number of the third feature maps FM3 in the dimensional direction does not change. On the other hand, in <Generation Method by Addition (3)>, the generated third feature map FM3 is a 1000 dimensional feature map. That is, the number of feature maps increases in the dimensional direction. The generated 1000 dimensional third feature map FM3 is further subjected to convolution operation in the next saliency block layer L1, so that the third feature map FM3 with a richer variation in feature amount is generated.

Next, effects of the object detection device 200 will be described with reference to FIGS. 22 to 30.

Hereinafter, a squeeze-and-excitation (SE) network is referred to as "SENet". In addition, VGG+BN to which SENet is added is referred to as "VGG+BN+SE". Furthermore, ResNet to which SENet is added is referred to as "ResNet+SE".

Hereinafter, reference sign "200'_1" is used for a conventional object detection device (not illustrated) including a feature amount extracting unit based on VGG and an object detection unit based on SSD. In addition, reference sign "200'_2" is used for a conventional object detection device (not illustrated) including a feature amount extracting unit based on VGG+BN+SE or ResNet+SE and including an object detection unit based on SSD. That is, these object detection devices 200'_1 and 200'_2 are to be compared with the object detection device 200. In addition, these object detection devices 200'_1 and 200'_2 do not have a unit corresponding to the first feature map generating unit 31 and do not have a unit corresponding to the third feature map generating unit 33.

Hereinafter, for the range with respect to the size of an individual object in an individual captured image, the range including a medium size is referred to as "Medium". Further, the range including a size smaller than the size included in Medium is referred to as "Small". Furthermore, the range including a size larger than the size included in Medium is referred to as "Large".

Specifically, for example, Small is a range including an object with a size smaller than 32×32 pixels, Medium is a range including an object with a size larger than 32×32 pixels and smaller than 96×96 pixels, and Large is a range including an object with a size larger than 96×96 pixels.

Hereinafter, for example, a data set based on Camera Monitoring System Driving Dataset (CMS-DD) and including only two classes of the eight classes illustrated in FIG. 3 as classification targets is referred to as "2class". Furthermore, for example, a data set based on CMS-DD and including only four classes of the eight classes illustrated in FIG. 3 as classification targets is referred to as "4class". Further, for example, a data set based on CMS-DD and including eight classes illustrated in FIG. 3 as classification targets is referred to as "8class".

Figure 22:
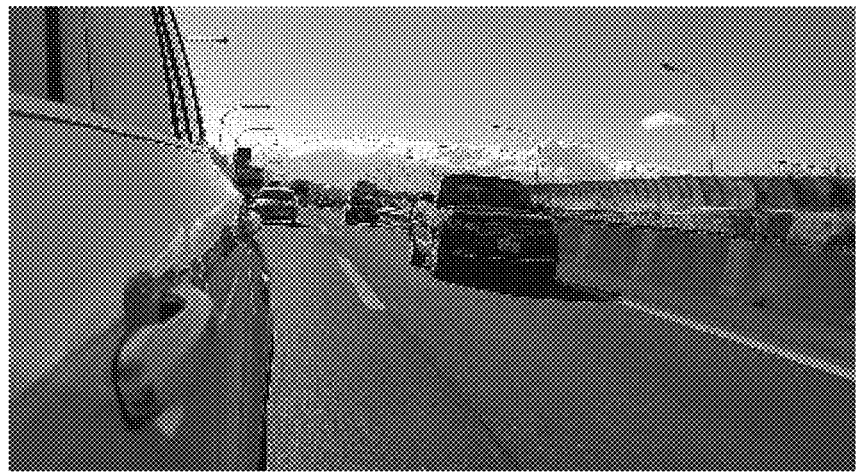
FIG. 22 is an explanatory diagram illustrating an example of a captured image.

FIG. 22 illustrates an example of a captured image.

Figure 23:
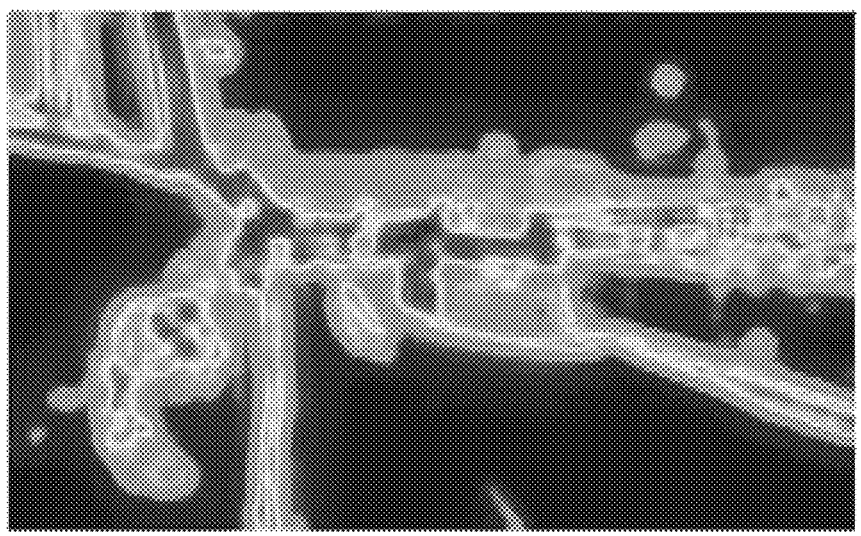
FIG. 23 is an explanatory diagram illustrating an example of a feature map corresponding to a saliency map.

FIG. 23 illustrates an example of a feature map corresponding to the first feature map FM1 generated by the object detection device 200 when image data indicating the captured image illustrated in FIG. 22 is input to the object detection device 200. More specifically, FIG. 23 illustrates an example of a feature map corresponding to the saliency map generated by the object detection device 200.

Figure 24:
FIG. 24 is an explanatory diagram illustrating an example of a feature map corresponding to a first feature map of a plurality of feature maps.

FIG. 24 illustrates an example of a feature map corresponding to one feature map FM' of a plurality of feature maps FM' generated by the object detection device 200'_2 when the image data indicating the captured image illustrated in FIG. 22 is input to the object detection device 200'_2. More specifically, FIG. 24 illustrates an example of a feature map corresponding to the first feature map FM' of the plurality of feature maps FM'.

Figure 25:
FIG. 25 is an explanatory diagram illustrating an example of a feature map corresponding to a first third feature map of a plurality of third feature maps.

FIG. 25 illustrates an example of a feature map corresponding to one of the third feature map FM3 of a plurality of third feature maps FM3 generated by the object detection device 200 when the image data indicating the captured image illustrated in FIG. 22 is input to the object detection device 200. More specifically, FIG. 25 illustrates an example of a feature map corresponding to the first third feature map FM3 of the plurality of third feature maps FM3.

In the feature map illustrated in FIG. 24, an area different from an area corresponding to an object to be detected (that is, another vehicle) is activated. More specifically, an area corresponding to the sky in the background is activated. On the other hand, in the feature map illustrated in FIG. 25, the area corresponding to an object to be detected (that is, another vehicle) is activated. This is because weighting is performed using the saliency map corresponding to the feature map illustrated in FIG. 23.

That is, in a case where SENet is used, a feature map fired in a wide area as a global feature is evaluated as obtaining a better feature. Therefore, the meaning of the fired area is not actually taken into account. For this reason, in object detection, a method in which weighting is performed by features derived from an object such as saliency is superior.

Therefore, by using the weighted third feature map FM3 for object detection, the following effects can be obtained as compared with a case where the feature map FM' is used for object detection (that is, as compared with a case where the first feature map FM1 before weighting is used for object detection).

First, the accuracy of object detection can be improved. Furthermore, since the context related to objectness is considered, the occurrence of erroneous detection can be suppressed.

Secondly, it is possible to achieve object detection based on feature amounts (that is, the second feature amount and the third feature amount) extracted by using a shallower CNN. As a result, the amount of calculation in the feature amount extracting unit (that is, the second feature amount extracting unit 23) can be reduced.

Third, by using a shallower CNN, it is possible to suppress loss of spatial information due to pooling. In addition, it is possible to increase the size of each of the feature maps (that is, each of the second feature map FM2 and the third feature map FM3) while avoiding an explosive increase in the amount of calculation. As a result, the detection of a small object can be achieved.

In particular, in a case where the object detection device 200 is used for an electronic mirror, it is required to use the on-vehicle processor 41 or processing circuit 43. That is, it is required to use the inexpensive processor 41 or processing circuit 43. In other words, it is required to use the processor 41 or the processing circuit 43 with low calculation capability. On the other hand, in this case, from the viewpoint of detecting another vehicle or the like traveling at a distant position from the position of the host vehicle, it is required to achieve the detection of a small object. By using the object detection device 200, the amount of calculation can be reduced, and the detection of a small object can be achieved.

Figure 26:
FIG. 26 is an explanatory diagram illustrating an example of a detection result of a comparative object detection device.
Figure 27:
FIG. 27 is an explanatory diagram illustrating an example of a detection result of the object detection device according to the first embodiment.

FIG. 26 illustrates an example of a detection result of the object detection device 200'_2 related to the captured image illustrated in FIG. 22. On the other hand, FIG. 27 illustrates an example of a detection result of the object detection device 200 related to the captured image illustrated in FIG. 22. As illustrated in FIGS. 26 and 27, by using the object detection device 200, it is possible to detect a small object as compared with the case of using the object detection device 200'_2. That is, it is possible to detect another vehicle or the like traveling at a distant position from the position of the host vehicle.

Figure 28:
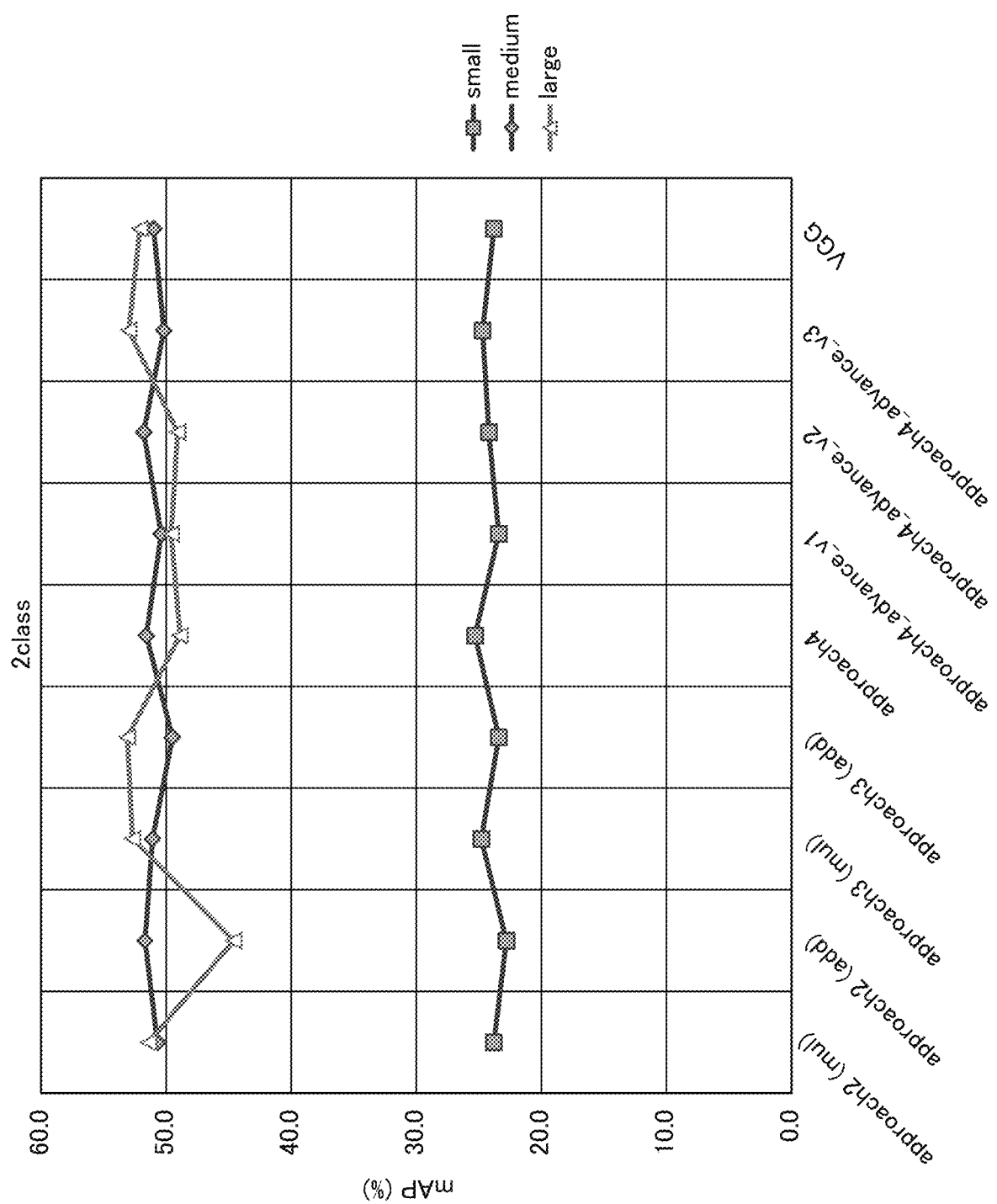
FIG. 28 is an explanatory diagram illustrating an example of the detection accuracy of the comparative object detection device and an example of the detection accuracy of the object detection device according to the first embodiment.
Figure 29:
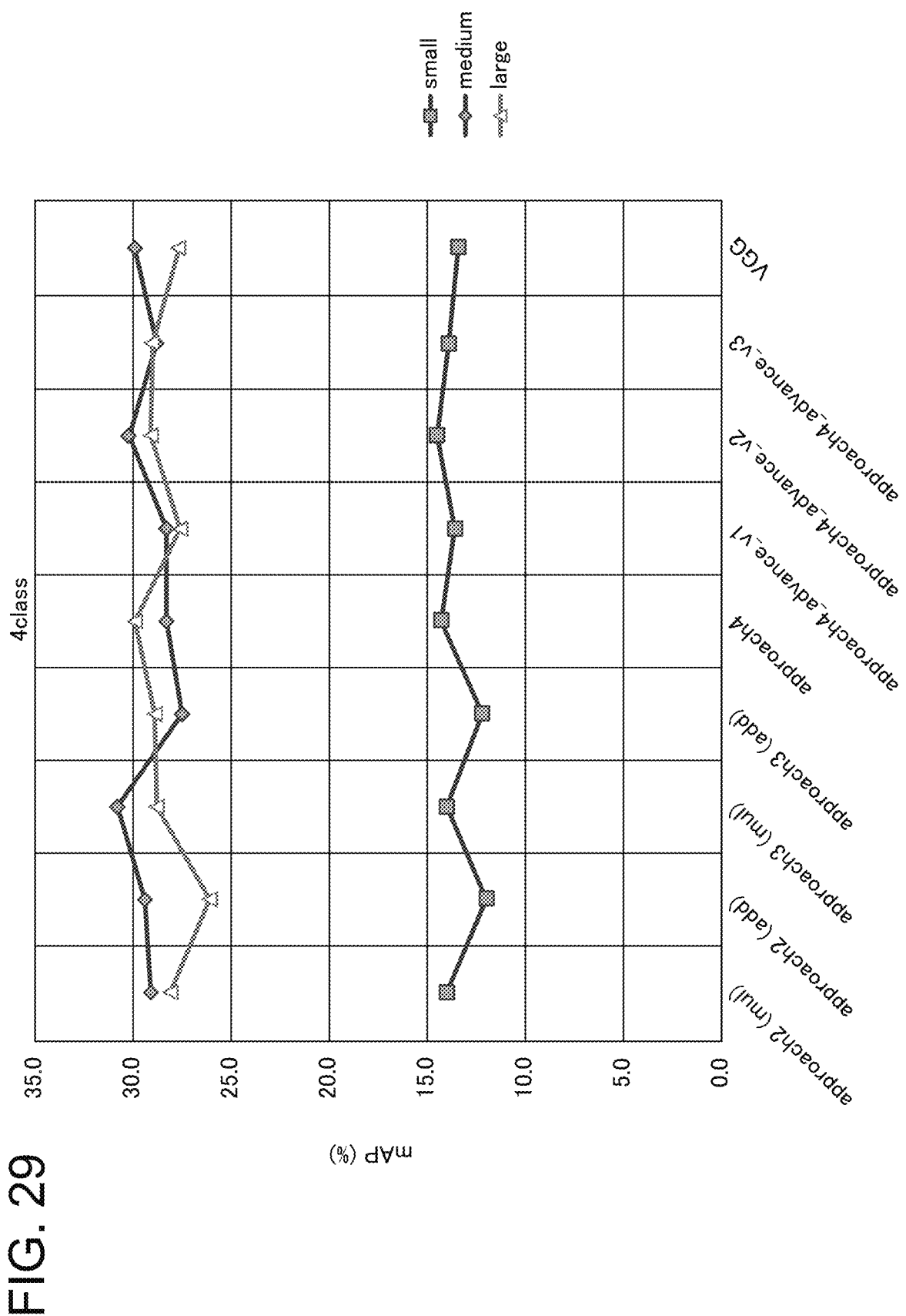
FIG. 29 is an explanatory diagram illustrating another example of the detection accuracy of the comparative object detection device and another example of the detection accuracy of the object detection device according to the first embodiment.
Figure 30:
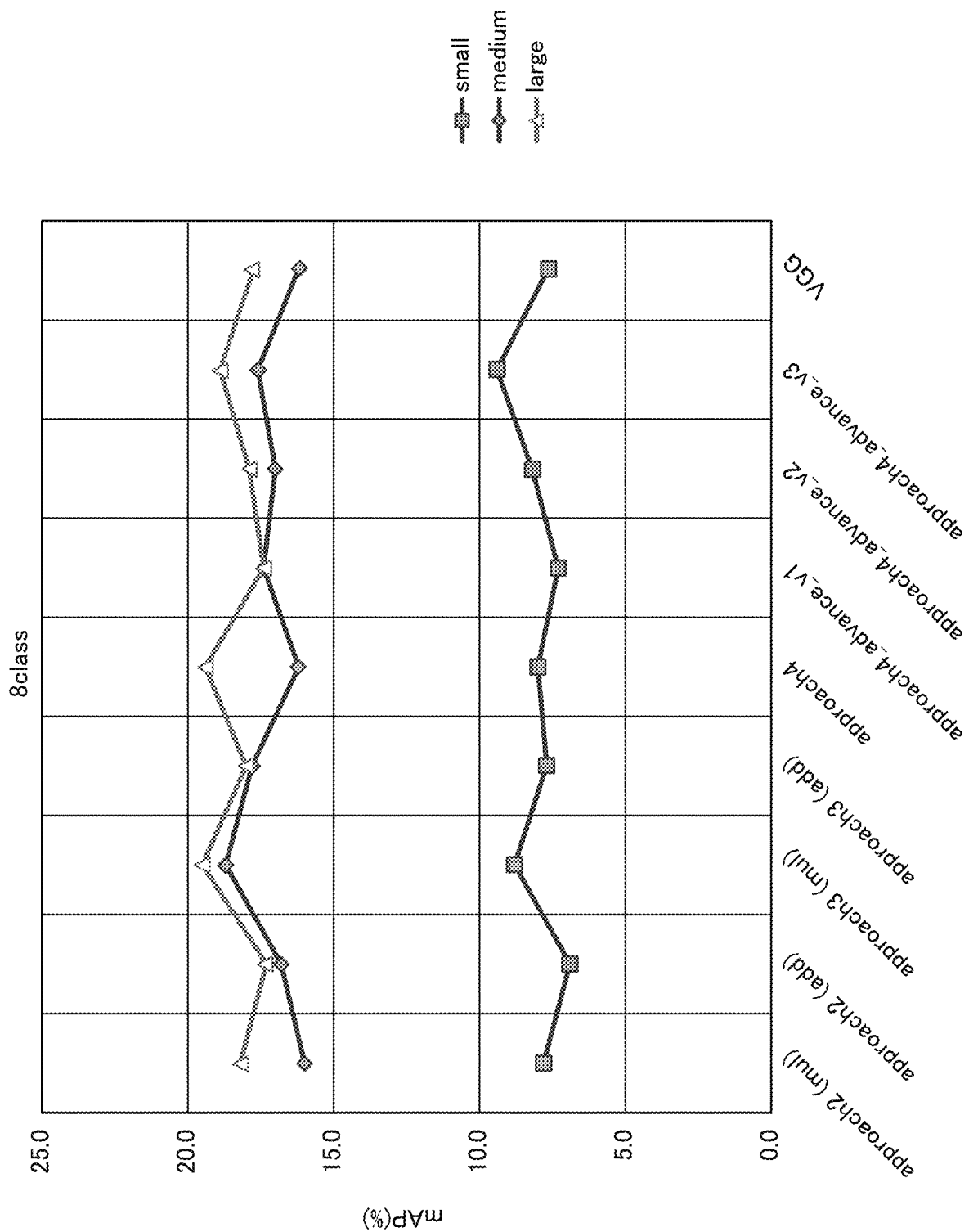
FIG. 30 is an explanatory diagram illustrating still another example of the detection accuracy of the comparative object detection device and still another example of the detection accuracy of the object detection device according to the first embodiment.

FIG. 28 is a line graph showing experimental results related to the detection accuracy of each of the object detection device 200 and the object detection device 200'_1 in a case where 2class is used. FIG. 29 is a line graph showing experimental results related to the detection accuracy of each of the object detection device 200 and the object detection device 200'_1 in a case where 4class is used. FIG. 30 is a line graph showing experimental results related to the detection accuracy of each of the object detection device 200 and the object detection device 200'_1 in a case where 8class is used. The unit of numerical values on the vertical axis in FIGS. 28 to 30 is mean average precision (mAP). The mAP is an accuracy evaluation index indicating the recognition rate of an object captured. Note that the number of layers in VGGNet is set to four.

FIGS. 28 to 30 illustrate experimental results based on the method by which the weighted third feature map FM3 used for object detection is generated, with respect to experimental results related to the detection accuracy of the object detection device 200.

In FIGS. 28 to 30, each numerical value indicated in "approach2 (mul)" indicates an experimental result related to the detection accuracy of the object detection device 200 in a case where the third feature map FM3 is generated using <Generation Method by Multiplication (1)> described above only in the first saliency block layer L1. Each numerical value indicated in "approach2(add'")" indicates an experimental result related to the detection accuracy of the object detection device 200 in a case where the third feature map FM3 is generated using <Generation Method by Addition (1)> described above only in the first saliency block layer L1. Each numerical value indicated in "approach3 (mul)" indicates an experimental result related to the detection accuracy of the object detection device 200 in a case where the third feature map FM3 is generated using <Generation Method by Multiplication (2)> described above only in the first saliency block layer L1. Each numerical value indicated in "approach3 (add)" indicates an experimental result related to the detection accuracy of the object detection device 200 in a case where the third feature map FM3 is generated using <Generation Method by Addition (2)> described above only in the first saliency block layer L1. Each numerical value indicated in "approach4" indicates an experimental result related to the detection accuracy of the object detection device 200 in a case where the third feature map FM3 is generated using <Generation Method by Addition (1)> described above in each saliency block layer L1. Each numerical value indicated in "approach4_advance_v1" indicates an experimental result related to the detection accuracy of the object detection device 200 in a case where the third feature map FM3 is generated using <Generation Method by Multiplication (1)> described above in each saliency block layer L1. Each numerical value indicated in "approach4_advance_v2" indicates an experimental result related to the detection accuracy of the object detection device 200 in a case where the third feature map FM3 is generated using <Generation Method by Addition (2)> described above in each saliency block layer L1. Each numerical value indicated in "approach4_advance_v3" indicates an experimental result related to the detection accuracy of the object detection device 200 in a case where the third feature map FM3 is generated using <Generation Method by Addition (3)> described above in each saliency block layer L1.

In addition, in FIGS. 28 to 30, each numerical value indicated in "VGG" indicates an experimental result related to the detection accuracy of the object detection device 200'_1.

As illustrated in FIGS. 28 to 30, by using the object detection device 200, the object detection accuracy can be improved as compared with the case of using the object detection device 200'_1. That is, the accuracy of object detection can be improved. Particularly, the evaluation of Small is important in an in-vehicle electronic mirror that is required to use the processor 41 or the processing circuit 43 with low calculation capability, but is required to achieve the detection of a small object. In general, it is said that, in CNN, it is difficult to acquire features of small objects unless deep networks (Deep CNNs) are used. On the other hand, if the deep network is used, the calculation speed becomes explosively slow. Therefore, it tends to be difficult to achieve the detection of a small object while reducing the amount of calculation.

The object detection device 200 can acquire feature amounts sufficient for detecting a small object while reducing the amount of calculation. By using the object detection device 200, the amount of calculation can be reduced, and the detection of a small object can be achieved.

Next, modifications of the object detection device 200 will be described.

It is only required that the individual first feature amount uses the mid-level feature corresponding to objectness. That is, the first feature amount is not limited to the saliency. The first feature map is not limited to the saliency map. For example, the first feature map generating unit 31 may generate a depth map using a distance image or a sonar image corresponding to each captured image. Alternatively, for example, the first feature map generating unit 31 may generate a thermal map using a temperature image corresponding to each captured image. That is, the weighting in the second feature amount extracting unit 23 may be performed by so-called "middle-level sensor fusion".

The distance image or the sonar image is obtained from, for example, a distance sensor, a millimeter wave radar, a sonar sensor, or an infrared sensor. The temperature image is obtained, for example, from a thermal sensor. Since the distance sensor can correctly measure the distance to an object, the accuracy of the first feature map indicating objectness increases in a case where the distance image obtained from the distance sensor is used. The millimeter wave radar can accurately measure the distance to an object even in bad weather. The sonar sensor or the infrared sensor can measure an object position at a short distance at low cost. The thermal sensor is suitable for night-time image capturing.

The first feature map generated by the first feature map generating unit 31 can be at least one of a saliency map based on a captured image, a depth map based on a distance image or a sonar image, or a heat map based on a thermal image.

For example, by generating the first feature map using the distance image, the sonar image, or the temperature image, the first feature map generating unit 31 can generate a first feature map based on the extracted feature as described above, and can generate a first feature map with high anonymity from the viewpoint of privacy protection.

Figure 31:
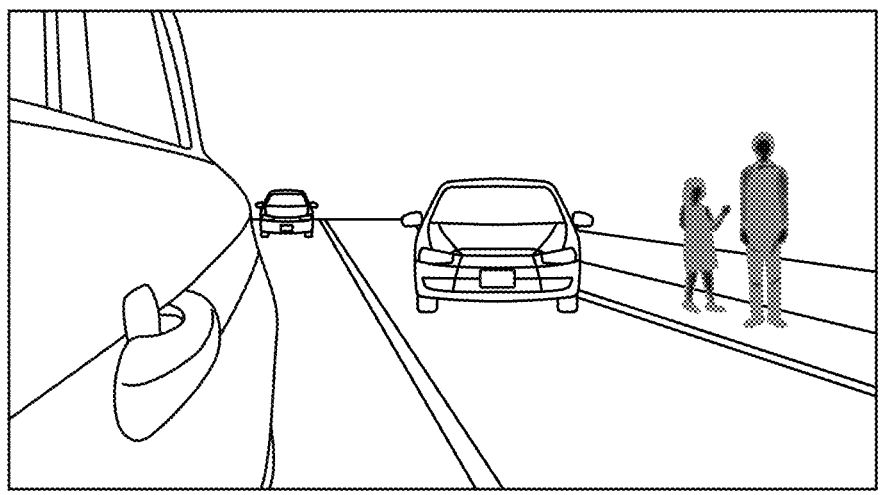
FIG. 31 is a diagram illustrating an example of a concept of a thermal map as a first feature map generated by a first feature map generating unit using temperature images corresponding to individual captured images.

Here, FIG. 31 is a diagram illustrating an example of an image of a thermal map as a first feature map generated by the first feature map generating unit 31 using temperature images corresponding to individual captured images. Since an area corresponding to a person is activated, the thermal map is suitable to be used as the first feature map in a case where it is desired to detect a person. In addition, the thermal map generated using the temperature image is more excellent in person detection at night than the first feature map generated using the captured image.

In addition, the method of generating the first feature map FM1 by the first feature map generating unit 31 is not limited to saliency estimation. For example, the first feature map generating unit 31 may generate the first feature map FM1 by performing at least one of edge detection, objectness estimation, or segmentation, instead of or in addition to the saliency estimation.

The object detection in the object detection unit 24 is not limited to the SSD. For example, the object detection in the object detection unit 24 may be performed by RetinaNet, Mask R-CNN, YOLO, or Faster R-CNN.

Furthermore, for example, the object detection in the object detection unit 24 may be performed by EfficientDet (see Reference Literature 3 below).

REFERENCE LITERATURE 3

Mingxing Tan, Ruoming Pang, Quoc V. Le, "EfficientDet: Scalable and Efficient Object Detection"; Proceedings of the IEEE/CVF Conference on Computer Vision and Pattern Recognition (CVPR), 2020, pp. 10781-10790

The object detection device 200 may include the training unit 25. The training unit 25 in the object detection device 200 may train the second feature amount extracting unit 23 and the object detection unit 24 by using an image captured by the camera 1 as a training image. In other words, the training unit 25 in the object detection device 200 may generate a machine learning model that receives the captured image by the camera 1 as input and outputs a detection result of each object in the captured image.

As described above, the object detection device 200 according to the first embodiment includes the image data acquiring unit 21 that acquires image data indicating an image captured by the camera 1, the first feature amount extracting unit 22 that generates the first feature map FM1 using the image data, the second feature amount extracting unit 23 that generates the second feature map FM2 using the image data, and generates the third feature map FM3 by performing addition or multiplication of the second feature map FM2 using the first feature map FM1 and weighting the second feature map FM2, and the object detection unit 24 that detects an object in the captured image using the third feature map FM3. The first feature amount in the first feature map FM1 uses a mid-level feature corresponding to objectness, and the second feature amount in the second feature map FM2 uses a high-level feature. As a result, the accuracy of object detection can be improved. In addition, the amount of calculation can be reduced. Moreover, the detection of a small object can be achieved.

In addition, the training device 400 according to the first embodiment includes the image data acquiring unit 21 that acquires image data indicating a training image, the first feature amount extracting unit 22 that generates the first feature map FM1 using the image data, the second feature amount extracting unit 23 that generates the second feature map FM2 using the image data, and generates the third feature map FM3 by performing addition or multiplication of the second feature map FM2 using the first feature map FM1 and weighting the second feature map FM2, the object detection unit 24 that detects an object in the training image using the third feature map FM3, and the training unit 25 that trains the second feature amount extracting unit 23 and the object detection unit 24 in accordance with a detection result of the object detection unit 24. The first feature amount in the first feature map FM1 uses the mid-level feature corresponding to objectness, and the second feature amount in the second feature map FM2 uses the high-level feature. As a result, the training device 400 for the object detection device 200 can be implemented.

Second Embodiment

Figure 32:
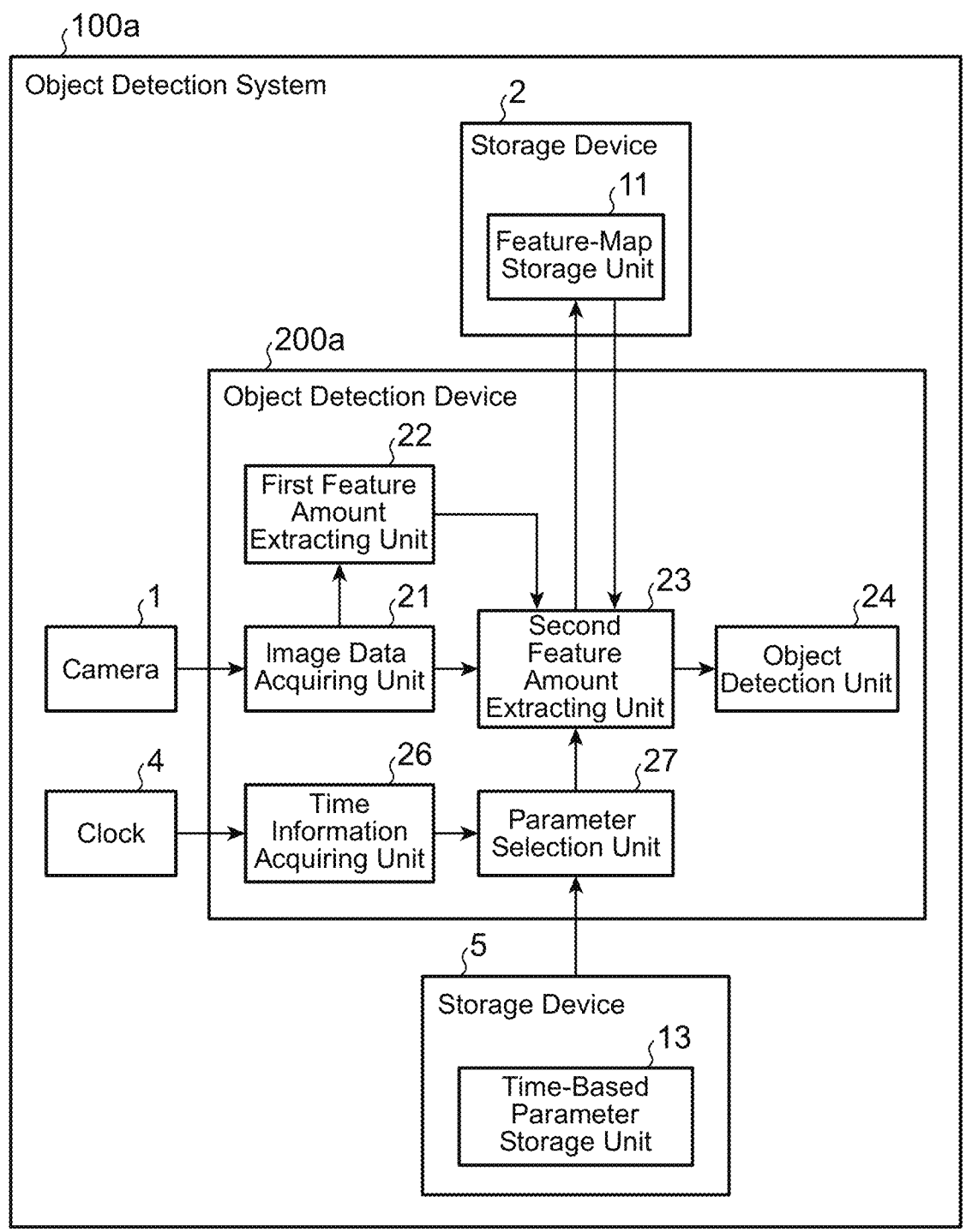
FIG. 32 is a block diagram illustrating the main part of an object detection system including an object detection device according to a second embodiment.

FIG. 32 is a block diagram illustrating the main part of an object detection system including an object detection device according to a second embodiment. The object detection system including the object detection device according to the second embodiment will be described with reference to FIG. 32. Note that, in FIG. 32, the same reference numerals are given to blocks similar to those illustrated in FIG. 1, and the description thereof will be omitted.

As illustrated in FIG. 32, an object detection system 100a includes the camera 1, the storage device 2, a clock 4, a storage device 5, and an object detection device 200a. The storage device 2 includes the feature-map storage unit 11. The storage device 5 includes a time-based parameter storage unit 13. The object detection device 200a includes the image data acquiring unit 21, the first feature amount extracting unit 22, the second feature amount extracting unit 23, the object detection unit 24, a time information acquiring unit 26, and a parameter selection unit 27. The storage device 5 includes a memory.

The time information acquiring unit 26 acquires information indicating a time (hereinafter, referred to as "time information") using the clock 4. The time information indicates, for example, a current time.

The time-based parameter storage unit 13 stores a database (hereinafter, referred to as "time-based trained parameter database") including a plurality of machine learning models in which a plurality of parameter sets are set. Each parameter set includes a trained parameter for the first neural network NN1 and a trained parameter for the second neural network NN2.

Here, the plurality of parameter sets included in the time-based trained parameter database correspond to mutually different time periods. For example, the time-based trained parameter database includes a parameter set corresponding to daytime, a parameter set corresponding to evening, a parameter set corresponding to dusk, and a parameter set corresponding to night time.

The parameter selection unit 27 selects a parameter set corresponding to a time period including the time indicated by the time information from the plurality of parameter sets included in the time-based trained parameter database. The parameter selection unit 27 sets parameters in the first neural network NN1 and parameters in the second neural network NN2 using the selected parameter set.

As a result, the second feature amount extracting unit 23 performs a second feature amount extracting process using the parameters set by the parameter selection unit 27. In addition, the object detection unit 24 performs an object detection process using the parameters set by the parameter selection unit 27.

In other words, the second feature amount extracting unit 23 performs the second feature amount extracting process using trained parameters included in the parameter set selected by the parameter selection unit 27. In addition, the object detection unit 24 performs the object detection process using trained parameters included in the parameter set selected by the parameter selection unit 27.

Figure 33:
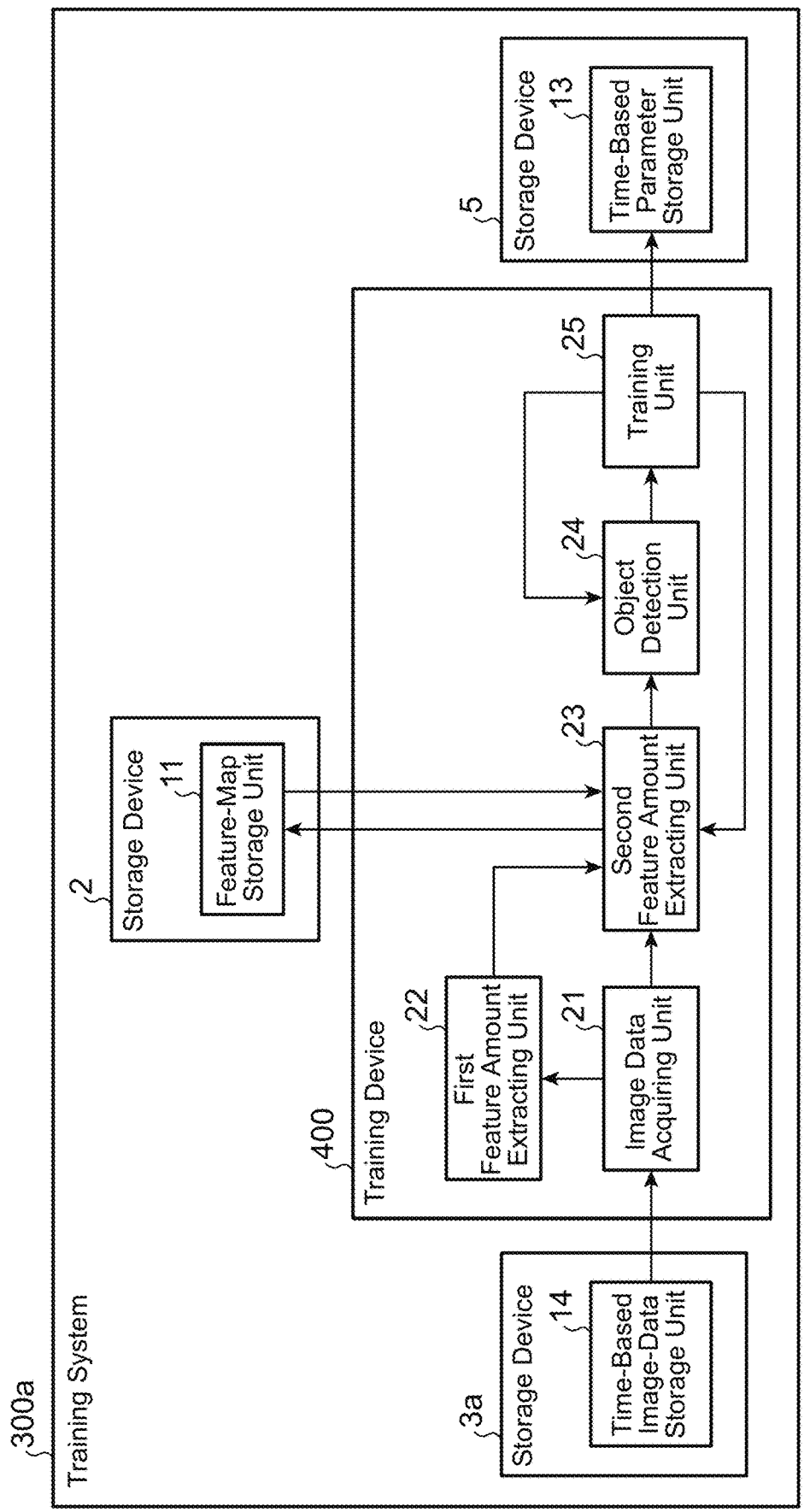
FIG. 33 is a block diagram illustrating the main part of a training system including a training device according to the second embodiment.

FIG. 33 is a block diagram illustrating the main part of a training system including a training device according to the second embodiment. The training system including the training device according to the second embodiment will be described with reference to FIG. 33. Note that, in FIG. 33, the same reference numerals are given to blocks similar to those illustrated in FIG. 4, and the description thereof will be omitted.

As illustrated in FIG. 33, a training system 300a includes the storage device 2, a storage device 3a, the storage device 5, and the training device 400. The storage device 2 includes the feature-map storage unit 11. The storage device 3a includes a time-based image-data storage unit 14. The storage device 5 includes a time-based parameter storage unit 13. The training device 400 includes the image data acquiring unit 21, the first feature amount extracting unit 22, the second feature amount extracting unit 23, the object detection unit 24, and the training unit 25.

The time-based image-data storage unit 14 stores a plurality of training image databases. The plurality of training image databases correspond to mutually different time periods. For example, the plurality of training image databases includes a training image database corresponding to daytime, a training image database corresponding to evening, a training image database corresponding to evening, and a training image database corresponding to night time.

That is, the plurality of training images included in each training image database are captured by a camera similar to the camera 1 at the time within the corresponding time period.

In the training system 300a, training of the second feature amount extracting unit 23 and the object detection unit 24 by the training unit 25 is performed using the individual training image databases. That is, such training is performed for each training image database. As a result, a plurality of machine learning models in which a plurality of parameter sets corresponding to mutually different time periods are set are generated. The training unit 25 stores the plurality of machine learning models in which the generated plurality of parameter sets are set in the time-based parameter storage unit 13. As a result, the time-based trained parameter database is generated.

Hereinafter, the function of the time information acquiring unit 26 may be denoted by reference sign "F6". In addition, the function of the parameter selection unit 27 may be denoted by reference sign "F7".

Hereinafter, the process performed by the time information acquiring unit 26 may be collectively referred to as "time information acquiring process". Further, the process performed by the parameter selection unit 27 may be collectively referred to as "parameter selection process".

The hardware configuration of the main part of the object detection device 200a is similar to that described in the first embodiment with reference to FIGS. 5 and 6. Therefore, illustration and description are omitted. That is, the object detection device 200a has a plurality of functions F1 to F4, F6, and F7. Each of the functions F1 to F4, F6, and F7 can be implemented by the processor 41 and the memory 42, or can be implemented by the dedicated processing circuit 43. In addition, the processing circuit 43 may include a plurality of processing circuits corresponding to the plurality of functions F1 to F4, F6 and F7.

The hardware configuration of the main part of the training device 400 is similar to that described in the first embodiment with reference to FIGS. 7 and 8. Therefore, illustration and description are omitted.

Figure 34:
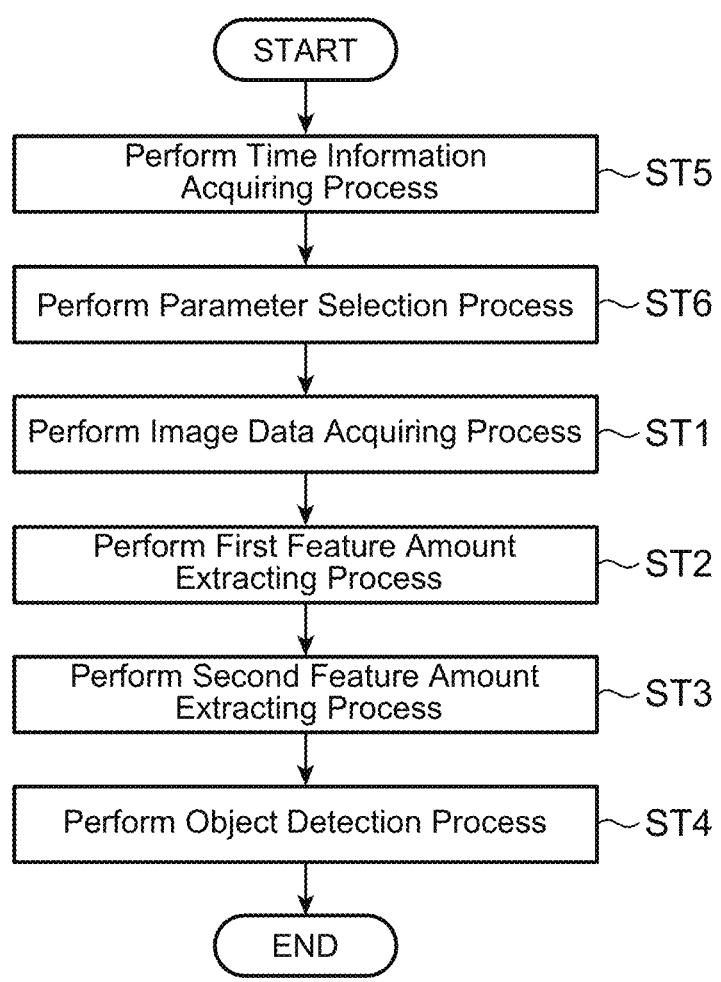
FIG. 34 is a flowchart illustrating an operation of the object detection device according to the second embodiment.

Next, an operation of the object detection device 200a will be described with reference to the flowchart of FIG. 34. Note that, in FIG. 34, the same reference numerals are given to steps similar to those illustrated in FIG. 9, and the description thereof will be omitted.

First, the time information acquiring unit 26 performs the time information acquiring process (step ST5). Next, the parameter selection unit 27 performs the parameter selection process (step ST6). Next, the processes of steps ST1 to ST4 are performed.

Figure 10:
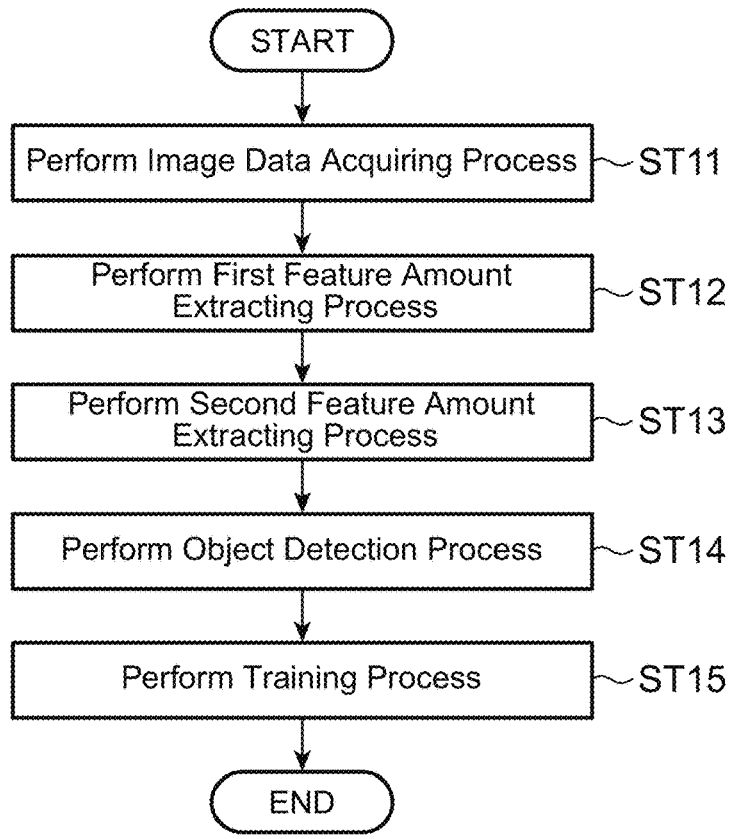
FIG. 10 is a flowchart illustrating an operation of the training device according to the first embodiment.

The operation of the training device 400 is similar to that described in the first embodiment with reference to the flowchart of FIG. 10. Therefore, illustration and description are omitted.

In this manner, the accuracy of object detection can be further improved by using the time-based training image database for training and using the time-based trained parameter database for inference. That is, appropriate network flexibility can be achieved.

Note that the object detection device 200a can adopt various modifications similar to those described in the first embodiment.

As described above, the object detection device 200a according to the second embodiment includes the time information acquiring unit 26 that acquires time information and the parameter selection unit 27 that selects a parameter set corresponding to the time indicated by the time information from parameter sets included in the time-based trained parameter database, and the second feature amount extracting unit 23 generates the second feature map FM2 and the third feature map FM3 using trained parameters included in the parameter set selected by the parameter selection unit 27. As a result, the accuracy of object detection can be further improved.

Third Embodiment

Figure 35:
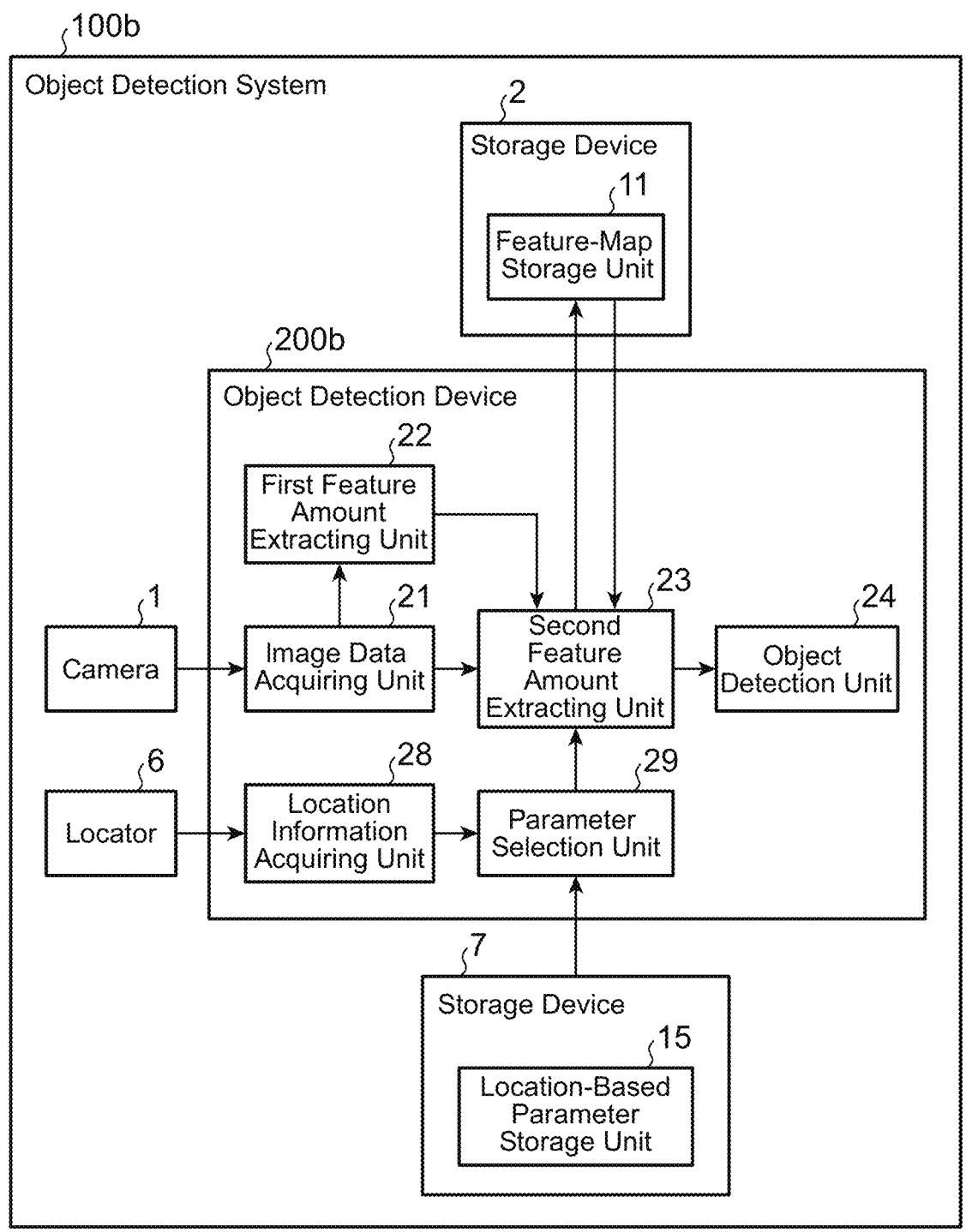
FIG. 35 is a block diagram illustrating the main part of an object detection system including an object detection device according to a third embodiment.

FIG. 35 is a block diagram illustrating the main part of an object detection system including an object detection device according to a third embodiment. The object detection system including the object detection device according to the third embodiment will be described with reference to FIG. 35. Note that, in FIG. 35, the same reference numerals are given to blocks similar to those illustrated in FIG. 1, and the description thereof will be omitted.

As illustrated in FIG. 35, an object detection system 100b includes the camera 1, the storage device 2, a locator 6, a storage device 7, and an object detection device 200b. The storage device 2 includes the feature-map storage unit 11. The storage device 7 includes a location-based parameter storage unit 15. The object detection device 200b includes the image data acquiring unit 21, the first feature amount extracting unit 22, the second feature amount extracting unit 23, the object detection unit 24, a location information acquiring unit 28, and a parameter selection unit 29. The storage device 7 includes a memory.

The location information acquiring unit 28 acquires information indicating a location (hereinafter, referred to as "location information") using the locator 6. More specifically, the location information indicates the type of a location corresponding to the current location of the host vehicle. For example, the location information indicates whether the location corresponding to the current location of the host vehicle is an urban area, a highway, or suburbs.

The location-based parameter storage unit 15 stores a database (hereinafter, referred to as "location-based trained parameter database") including a plurality of machine learning models in which a plurality of parameter sets are set. Each parameter set includes a trained parameter for the first neural network NN1 and a trained parameter for the second neural network NN2.

Here, the plurality of parameter sets included in the location-based trained parameter database correspond to mutually different locations. For example, the location-based trained parameter database includes a parameter set corresponding to a metropolitan area, a parameter set corresponding to the highway, and a parameter set corresponding to the suburbs.

The parameter selection unit 29 selects a parameter set corresponding to the location indicated by the location information from the plurality of parameter sets included in the location-based trained parameter database. The parameter selection unit 29 sets parameters in the first neural network NN1 and parameters in the second neural network NN2 using the selected parameter set.

As a result, the second feature amount extracting unit 23 performs a second feature amount extracting process using the parameters set by the parameter selection unit 29. In addition, the object detection unit 24 performs an object detection process using the parameters set by the parameter selection unit 29.

In other words, the second feature amount extracting unit 23 performs the second feature amount extracting process using trained parameters included in the parameter set selected by the parameter selection unit 29. In addition, the object detection unit 24 performs the object detection process using trained parameters included in the parameter set selected by the parameter selection unit 29.

Figure 36:
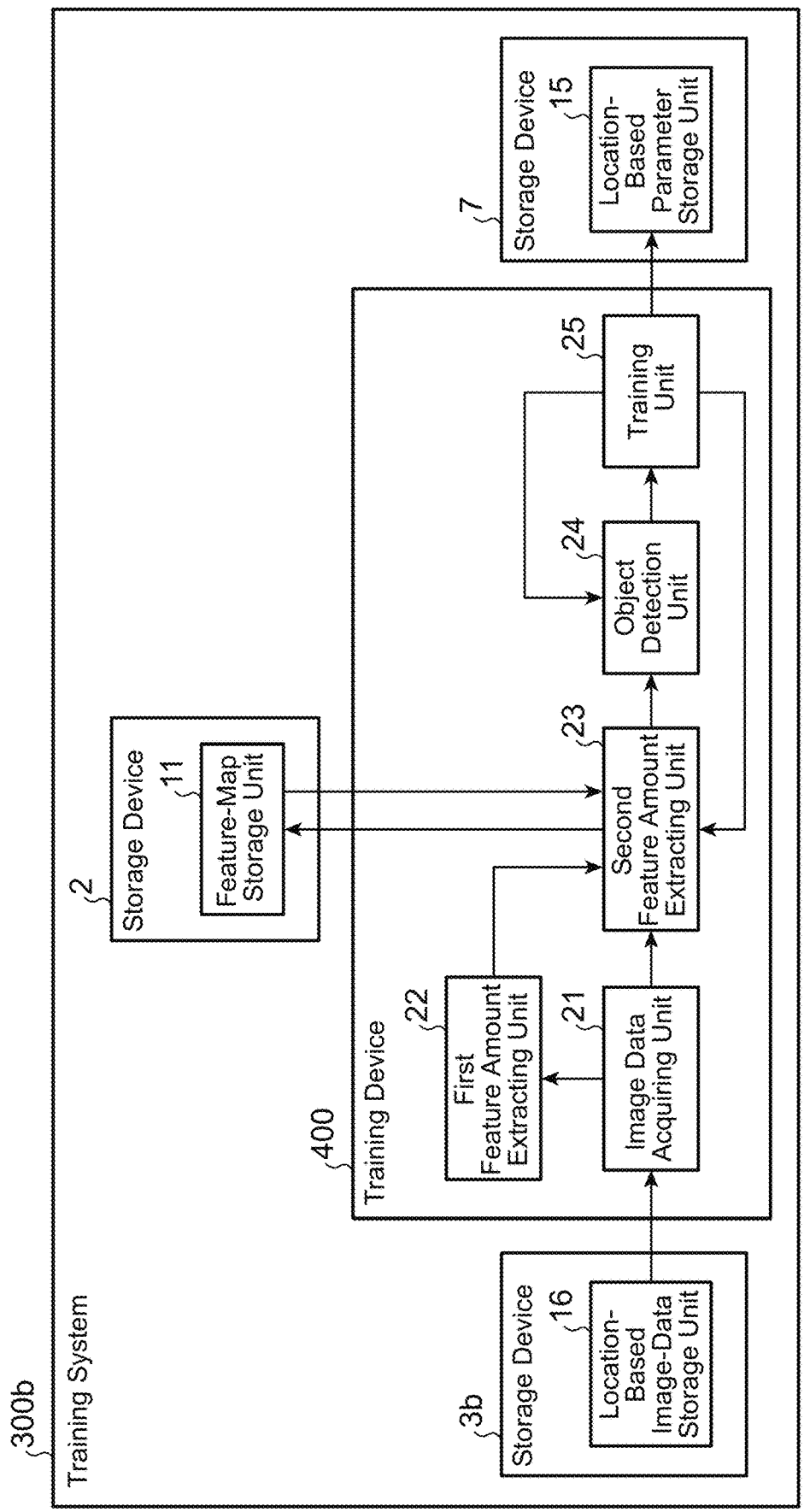
FIG. 36 is a block diagram illustrating the main part of a training system including a training device according to the third embodiment.

FIG. 36 is a block diagram illustrating the main part of a training system including a training device according to the third embodiment. The training system including the training device according to the third embodiment will be described with reference to FIG. 36. Note that, in FIG. 36, the same reference numerals are given to blocks similar to those illustrated in FIG. 4, and the description thereof will be omitted.

As illustrated in FIG. 36, a training system 300*b* includes the storage device 2, a storage device 3*b*, the storage device 7, and the training device 400. The storage device 2 includes the feature-map storage unit 11. The storage device 3*b* includes a location-based image-data storage unit 16. The storage device 7 includes the location-based parameter storage unit 15. The training device 400 includes the image data acquiring unit 21, the first feature amount extracting unit 22, the second feature amount extracting unit 23, the object detection unit 24, and the training unit 25.

The location-based image-data storage unit 16 stores a plurality of training image databases. The plurality of training image databases correspond to mutually different time locations. For example, the plurality of training image databases include a training image database corresponding to an urban area, a training image database corresponding to a highway, and a training image database corresponding to suburbs.

That is, the plurality of training images included in each training image database are captured by a camera similar to the camera 1 at the corresponding location.

In the training system 300*b*, training of the second feature amount extracting unit 23 and the object detection unit 24 by the training unit 25 is performed using the individual training image databases. That is, such training is performed for each training image database. As a result, a plurality of parameter sets corresponding to mutually different locations are generated. The training unit 25 stores the generated plurality of parameter sets in the location-based parameter storage unit 15. As a result, the location-based trained parameter database is generated.

Hereinafter, the function of the location information acquiring unit 28 may be denoted by reference sign "F8". In addition, the function of the parameter selection unit 29 may be denoted by reference sign "F9".

Hereinafter, the process performed by the location information acquiring unit 28 may be collectively referred to as "location information acquiring process". In addition, the process performed by the parameter selection unit 29 may be collectively referred to as "parameter selection process".

The hardware configuration of the main part of the object detection device 200*b* is similar to that described in the first embodiment with reference to FIGS. 5 to 6. Therefore, illustration and description are omitted. That is, the object detection device 200*b* has a plurality of functions F1 to F4, F8, and F9. Each of the functions F1 to F4, F8, and F9 may be implemented by the processor 41 and the memory 42, or may be implemented by the dedicated processing circuit 43. The processing circuit 43 may include a plurality of processing circuits corresponding to the plurality of functions F1 to F4, F8 and F9.

The hardware configuration of the main part of the training device 400 is similar to that described in the first embodiment with reference to FIGS. 7 and 8. Therefore, illustration and description are omitted.

Figure 37:
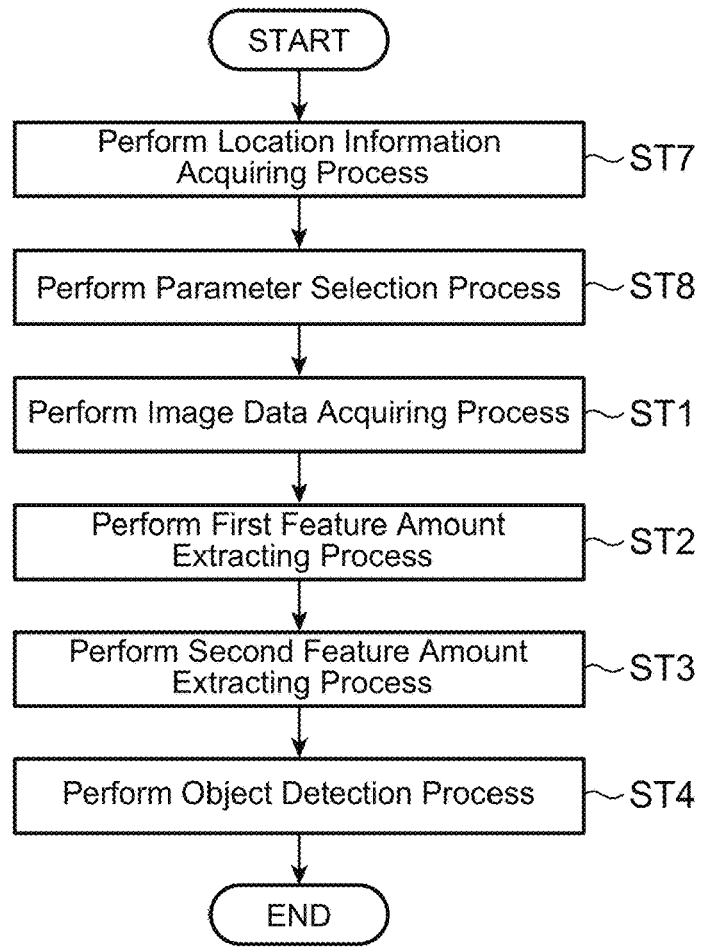
FIG. 37 is a flowchart illustrating an operation of the object detection device according to the third embodiment.

Next, an operation of the object detection device 200*b* will be described with reference to the flowchart of FIG. 37. Note that, in FIG. 37, the same reference numerals are given to steps similar to those illustrated in FIG. 9, and the description thereof will be omitted.

First, the location information acquiring unit 28 performs the location information acquiring process (step ST7). Next, the parameter selection unit 29 performs the parameter selection process (step ST8). Next, the processes of steps ST1 to ST4 are performed.

The operation of the training device 400 is similar to that described in the first embodiment with reference to FIG. 10. Therefore, illustration and description are omitted.

In this manner, the accuracy of object detection can be further improved by using the location-based training image database for training and using the location-based trained parameter database for inference. That is, appropriate network flexibility can be achieved.

Note that the object detection device 200*b* can adopt various modifications similar to those described in the first embodiment.

As described above, the object detection device 200*b* according to the third embodiment includes the location information acquiring unit 28 that acquires location information and the parameter selection unit 29 that selects a parameter set corresponding to the location indicated by the location information from parameter sets included in the location-based trained parameter database, and the second feature amount extracting unit 23 generates the second feature map FM2 and the third feature map FM3 using trained parameters included in the parameter set selected by the parameter selection unit 29. As a result, the accuracy of object detection can be further improved.

Fourth Embodiment

Figure 38:
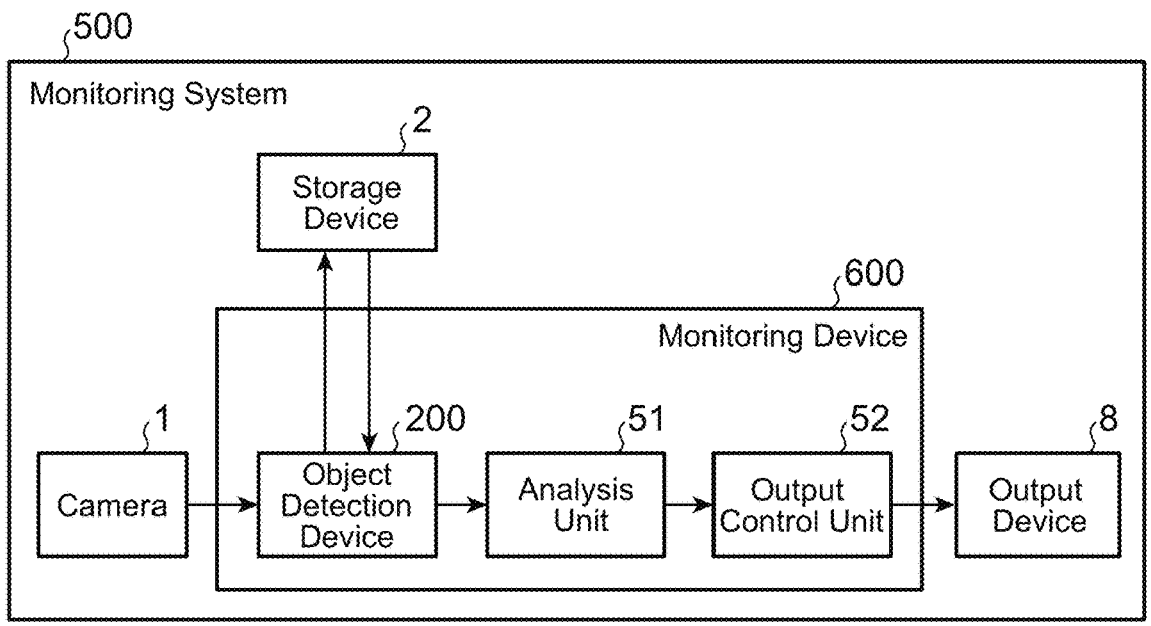
FIG. 38 is a block diagram illustrating the main part of a monitoring system including a monitoring device according to a fourth embodiment.
Figure 39:
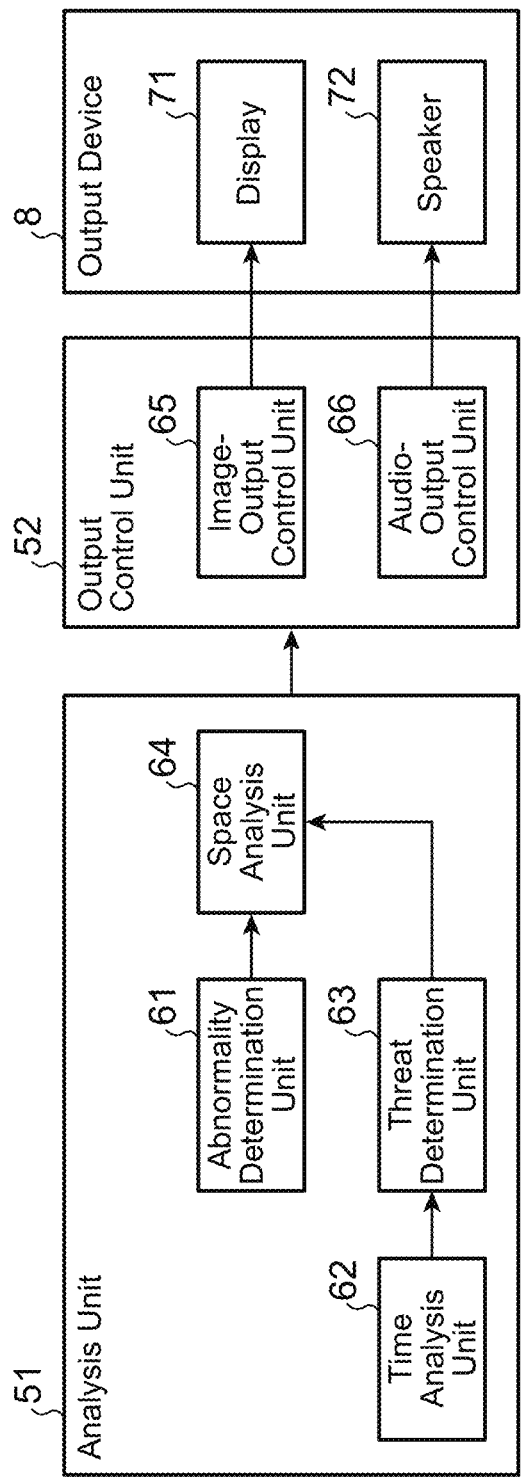
FIG. 39 is a block diagram illustrating the main parts of an analysis unit and an output control unit in the monitoring device according to the fourth embodiment.

FIG. 38 is a block diagram illustrating the main part of a monitoring system including a monitoring device according to a fourth embodiment. FIG. 39 is a block diagram illustrating the main parts of an analysis unit and an output control unit in the monitoring device according to the fourth embodiment. The monitoring system including the monitoring device according to the fourth embodiment will be described with reference to FIGS. 38 and 39. Note that, in FIG. 38, the same reference numerals are given to blocks similar to those illustrated in FIG. 1, and the description thereof will be omitted.

As illustrated in FIG. 38, a monitoring system 500 includes the camera 1, the storage device 2, an output device 8, and a monitoring device 600. The monitoring device 600 includes the object detection device 200, an analysis unit 51, and an output control unit 52.

As illustrated in FIG. 39, the analysis unit 51 includes an abnormality determination unit 61, a time analysis unit 62, a threat determination unit 63, and a space analysis unit 64. The output control unit 52 includes an image-output control unit 65 and an audio-output control unit 66. The output device 8 includes a display 71 and a speaker 72.

As described in the first embodiment, the camera 1 includes, for example, a monitoring camera, a security camera, or an electronic mirror camera. Here, in a case where the camera 1 includes an electronic mirror camera, the display 71 includes an electronic mirror display. That is, in this case, the camera 1 and the display 71 constitute the main part of the electronic mirror. Hereinafter, an example of this case will be mainly described.

The abnormality determination unit 61 determines the degree of abnormality A of each object using the detection result of the object detection unit 24. More specifically, the abnormality determination unit 61 determines the degree of abnormality A on the basis of the position of each object by using the estimation result of the position estimation unit 34.

For example, in a case where another vehicle is detected by the object detection unit 24, when such another vehicle is located at a normal position (for example, a position corresponding to an inter-vehicle distance of a predetermined value or more), the degree of abnormality A is set to a value smaller than that obtained when such another vehicle is located at an abnormal position (for example, a position corresponding to an inter-vehicle distance of less than the predetermined value). On the other hand, in this case, when another vehicle is located at the abnormal position (the same as the above), the degree of abnormality A is set to a value larger than that obtained when another vehicle is located at the normal position (the same as the above).

The time analysis unit 62 temporally analyzes the detection result of the object detection unit 24. That is, the time analysis unit 62 temporally analyzes results of a plurality of times of object detection processes corresponding to a plurality of temporally consecutive captured images. In other words, the time analysis unit 62 temporally analyzes the result of the object detection process for a plurality of frames. As a result, the time analysis unit 62 calculates a temporal change amount $\Delta S$ of the size of each object in the video captured by the camera 1.

Specifically, for example, the time analysis unit 62 calculates the expansion rate per unit time of the bounding box corresponding to each object. The time analysis unit 62 calculates the temporal change amount $\Delta S$ by integrating the calculated expansion rates.

The threat determination unit 63 determines the degree of threat T of each object using the detection result of the object detection unit 24. More specifically, the threat determination unit 63 determines the degree of threat T on the basis of the traveling direction of each object by using the estimation result of the type estimation unit 35.

That is, as described in the first embodiment, the class classified by the type estimation unit 35 includes the traveling direction of the object. Therefore, for example, in a case where another vehicle is detected by the object detection unit 24, when another vehicle is a following vehicle or a passing vehicle, the degree of threat T is set to a value larger than that obtained when another vehicle is an oncoming vehicle. On the other hand, in this case, when another vehicle is an oncoming vehicle, the degree of threat T is set to a smaller value than that obtained when another vehicle is a following vehicle or a passing vehicle.

In addition, the threat determination unit 63 determines the degree of threat T of each object using the analysis result of the time analysis unit 62.

That is, the threat determination unit 63 performs the following calculation on each object. Every time the temporal change amount $\Delta S$ is calculated by the time analysis unit 62, the threat determination unit 63 compares the calculated temporal change amount $\Delta S$ with a threshold $\Delta S_{th}$. When the temporal change amount $\Delta S$ exceeds the threshold $\Delta S_{th}$, the degree of threat T is set to a larger value than that obtained when the temporal change amount $\Delta S$ is equal to or less than the threshold $\Delta S_{th}$. On the other hand, when the temporal change amount $\Delta S$ is equal to or less than the threshold $\Delta S_{th}$, the degree of threat T is set to a smaller value than that obtained when the temporal change amount $\Delta S$ exceeds the threshold $\Delta S_{th}$. At that time, the threshold $\Delta S_{th}$ is set to a value based on an average value $\Delta S\_ave$ of the temporal change amounts $\Delta S$ calculated in the past for the corresponding object.

The space analysis unit 64 generates a risk map by spatially analyzing the determination result of the abnormality determination unit 61 and the determination result of the threat determination unit 63. The risk map includes a plurality of risk values arranged two-dimensionally. Each risk value is a value weighted by the corresponding degree of abnormality A and is also a value weighted by the corresponding degree of threat T.

As described above, the analysis unit 51 analyzes the detection result of the object detection unit 24.

The image-output control unit 65 outputs an image signal corresponding to the analysis result of the analysis unit 51 to a display 71. As a result, the image-output control unit 65 executes control to display an image corresponding to the analysis result of the analysis unit 51 on the display 71. The audio-output control unit 66 outputs an audio signal corresponding to the analysis result of the analysis unit 51 to a speaker 72. As a result, the audio-output control unit 66 executes control to output a voice corresponding to the analysis result of the analysis unit 51 to the speaker 72.

In this manner, the output control unit 52 outputs a signal corresponding to the analysis result of the analysis unit 51 to the output device 8. Hereinafter, the signals output from the output control unit 52 may be collectively referred to as "analysis result signals".

Here, the image signal output from the image-output control unit 65 may indicate an image (hereinafter, referred to as "risk map image") including the risk map generated by the space analysis unit 64. As a result, the risk map image may be displayed on the display 71.

Figure 40:
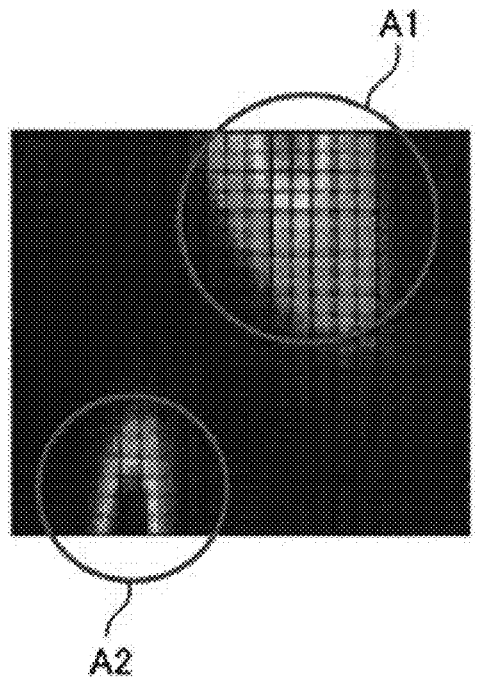
FIG. 40 is an explanatory diagram illustrating an example of a risk map image.

FIG. 40 illustrates an example of a risk map image. In the risk map corresponding to the risk map image illustrated in FIG. 40, the risk values in two areas A1 and A2 are set to values higher than the risk values in the other areas. As a result, in the risk map image illustrated in FIG. 40, the colors of the two areas A1 and A2 are displayed in colors different from the colors of the other areas. The two areas A1 and A2 correspond to, for example, two other vehicles.

As described above, in the risk map image, individual risk values in the risk map are visualized. By the display 71 displaying the risk map image, such risk values can be visually presented to the occupant of the host vehicle.

Hereinafter, the function of the analysis unit 51 may be denoted by reference sign "F11". Furthermore, the function of the output control unit 52 may be denoted by reference sign "F12".

Hereinafter, the process performed by the object detection device 200 may be collectively referred to as "object detection process and the like". That is, the object detection process and the like include the image data acquiring process, the first feature amount extracting process, the second feature amount extracting process, and the object detection process. Furthermore, the process performed by the analysis unit 51 may be collectively referred to as "analysis process". Further, the process and control executed by the output control unit 52 may be collectively referred to as "output control".

Next, a hardware configuration of the main part of the monitoring device 600 will be described with reference to FIGS. 41 and 42.

Figure 41:
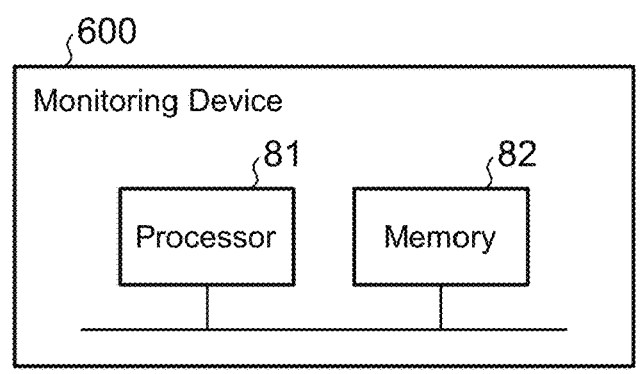
FIG. 41 is a block diagram illustrating a hardware configuration of the main part of the monitoring device according to the fourth embodiment.

As illustrated in FIG. 41, the monitoring device 600 includes a processor 81 and a memory 82. The memory 82 stores programs corresponding to the plurality of functions F1 to F4, F11, and F12. The processor 81 reads and executes the programs stored in the memory 82. As a result, the plurality of functions F1 to F4, F11, and F12 are implemented.

Figure 42:
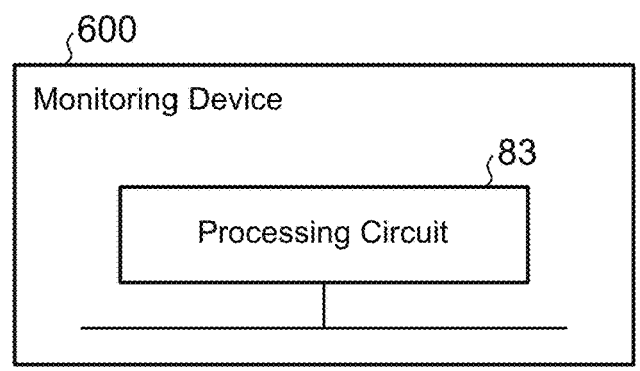
FIG. 42 is a block diagram illustrating another hardware configuration of the main part of the monitoring device according to the fourth embodiment.

Alternatively, as illustrated in FIG. 42, the monitoring device 600 includes a processing circuit 83. In this case, the plurality of functions F1 to F4, F11, and F12 are implemented by the dedicated processing circuit 83.

Alternatively, the monitoring device 600 includes the processor 81, the memory 82, and the processing circuit 83 (not illustrated). In this case, some of the functions F1 to F4, F11, and F12 are implemented by the processor 81 and the memory 82, and the remaining functions of the functions F1 to F4, F11, and F12 are implemented by the dedicated processing circuit 83.

The processor 81 includes one or more processors. Each processor uses, for example, a CPU, a GPU, a microprocessor, a microcontroller, or a DSP.

The memory 82 includes one or more nonvolatile memories. Alternatively, the memory 82 includes one or more nonvolatile memories and one or more volatile memories. That is, the memory 82 includes one or more memories. Each memory uses, for example, a semiconductor memory, a magnetic disk, an optical disk, a magneto-optical disk, or a magnetic tape.

More specifically, each volatile memory uses, for example, a RAM. In addition, each nonvolatile memory uses, for example, a ROM, a flash memory, an EPROM, an EEPROM, a solid state drive, a hard disk drive, a flexible disk, a compact disk, a DVD, a Blu-ray disk, or a mini disk.

The processing circuit 83 includes one or more digital circuits. Alternatively, the processing circuit 83 includes one or more digital circuits and one or more analog circuits. That is, the processing circuit 83 includes one or more processing circuits. Each processing circuit uses, for example, an ΔSIC, a PLD, an FPGA, an SoC, or a system LSI.

Here, when the processing circuit 83 includes a plurality of processing circuits, the correspondence relationship between the plurality of functions F1 to F4, F11, and F12 and the plurality of processing circuits is freely determined. For example, the monitoring device 600 may include a plurality of processing circuits corresponding to the plurality of functions F1 to F4, F11, and F12 on a one-to-one basis. In this case, each of the plurality of functions F1 to F4, F11, and F12 may be implemented exclusively by a corresponding one of the plurality of processing circuits.

Figure 43:
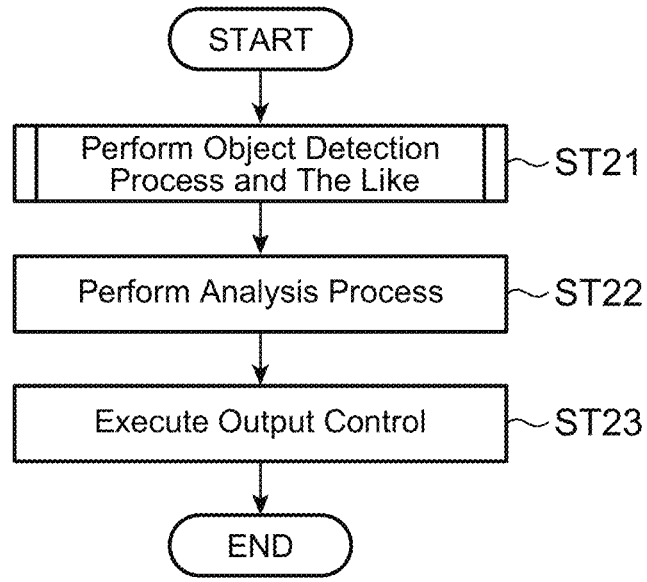
FIG. 43 is a flowchart illustrating an operation of the monitoring device according to the fourth embodiment.

Next, an operation of the monitoring device 600 will be described with reference to the flowchart of FIG. 43.

First, the object detection device 200 performs the object detection process and the like (step ST21). Next, the analysis unit 51 performs the analysis process (step ST22). Next, the output control unit 52 executes output control (step ST23).

Next, modification of the monitoring system 500 will be described with reference to FIGS. 44 and 45.

Figure 44:
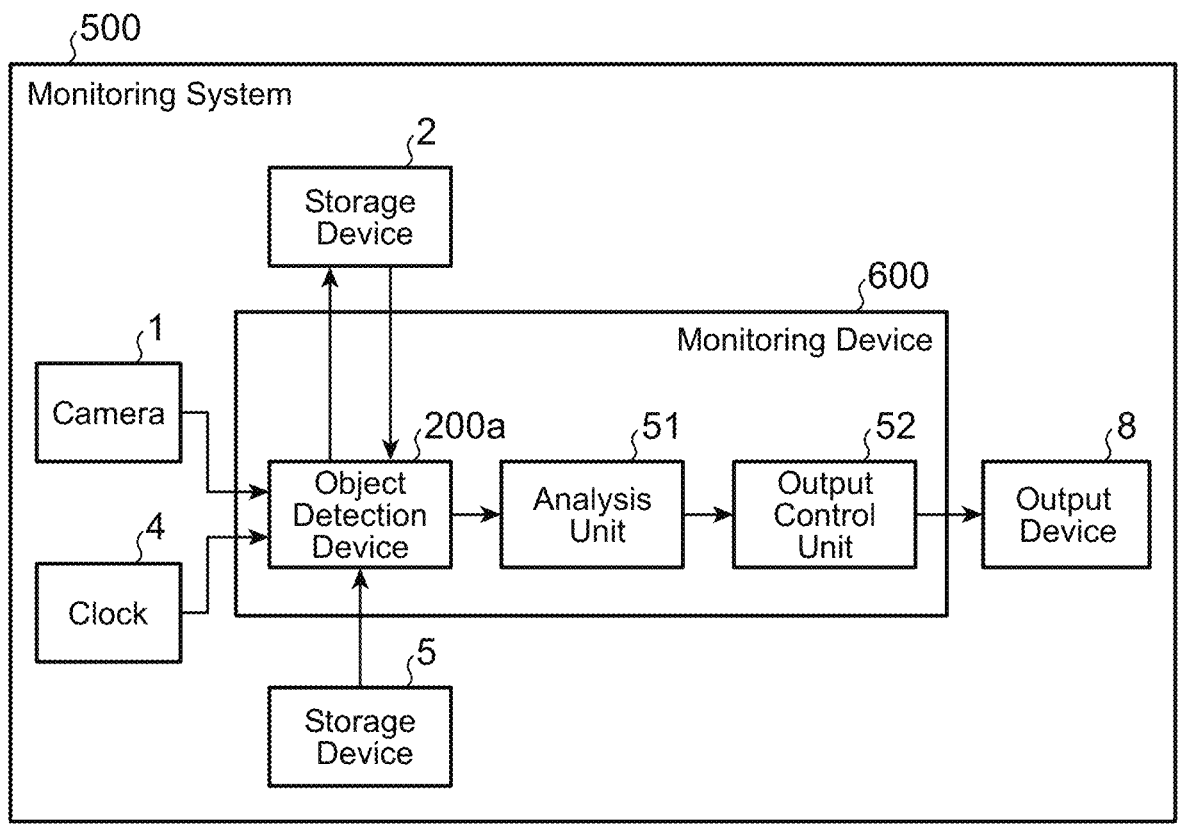
FIG. 44 is a block diagram illustrating the main part of a monitoring system including another monitoring device according to the fourth embodiment.

As illustrated in FIG. 44, the monitoring device 600 may include an object detection device 200a instead of the object detection device 200. In this case, the monitoring system 500 may include the clock 4 and the storage device 5.

Figure 45:
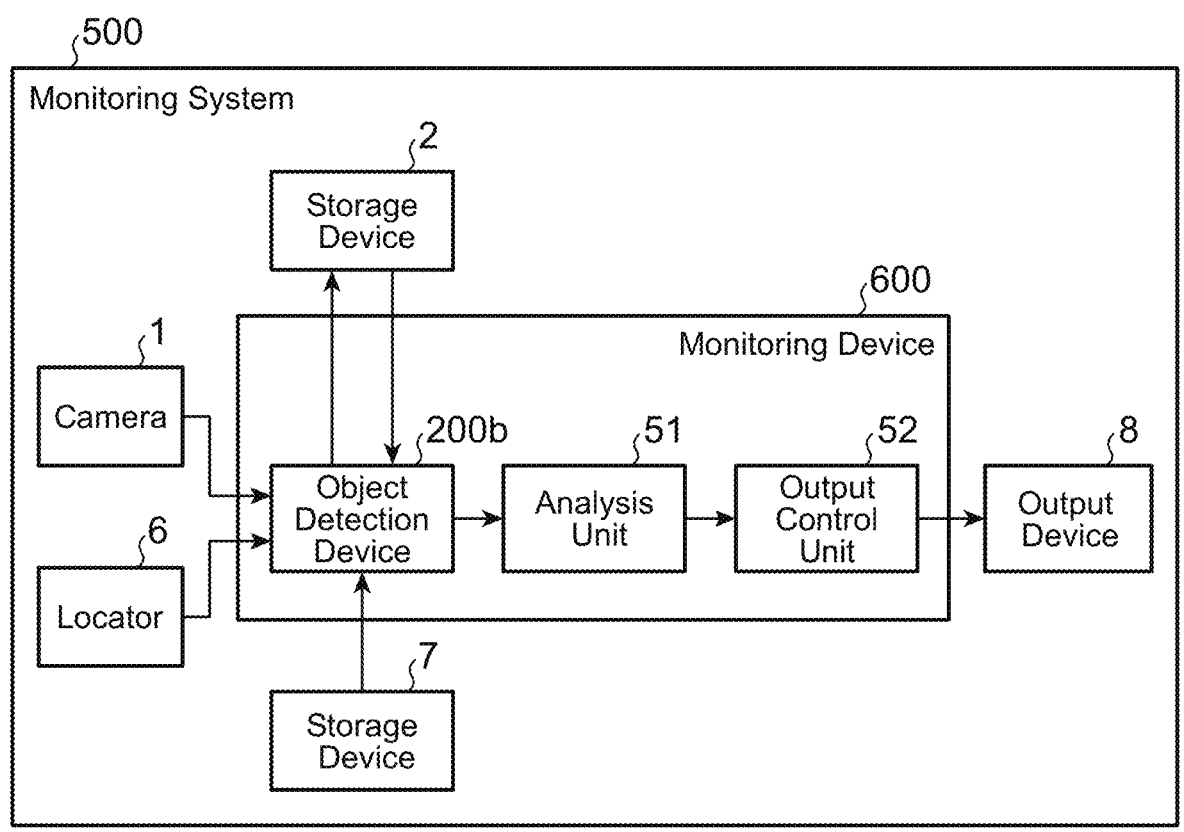
FIG. 45 is a block diagram illustrating the main part of a monitoring system including still another monitoring device according to the fourth embodiment.

Alternatively, as illustrated in FIG. 45, the monitoring device 600 may include an object detection device 200b instead of the object detection device 200. In this case, the monitoring system 500 may include the locator 6 and the storage device 7.

Next, modifications of the monitoring device 600 will be described.

The analysis unit 51 may include only one of the abnormality determination unit 61 or the threat determination unit 63. In a case where the analysis unit 51 includes only the abnormality determination unit 61, each risk value in the risk map is a value weighted by the corresponding degree of abnormality A. On the other hand, in a case where the analysis unit 51 includes only the threat determination unit 63, each risk value in the risk map is a value weighted by the corresponding degree of threat T.

The threat determination unit 63 may perform only one of the determination of the degree of threat T based on the estimation result of the type estimation unit 35 or the determination of the degree of threat T based on the analysis result of the time analysis unit 62.

The output control unit 52 may include only one of the image-output control unit 65 or the audio-output control unit 66. In a case where the output control unit 52 includes only the image-output control unit 65, the output device 8 may include only the display 71 out of the display 71 and the speaker 72. On the other hand, in a case where the output control unit 52 includes only the audio-output control unit 66, the output device 8 may include only the speaker 72 out of the display 71 and the speaker 72.

Next, modifications of the object detection device 200, the object detection device 200a, or the object detection device 200b in the monitoring device 600 will be described.

As described above, the time analysis unit 62 temporally analyzes the detection result of the object detection unit 24. From the viewpoint of coping with such analysis, the object detection device 200, the object detection device 200a, or the object detection device 200b in the monitoring device 600 may be configured as follows.

The image data acquiring unit 21 may acquire image data corresponding to a plurality of temporally consecutive captured images (that is, still images of a plurality of frames). That is, the image data acquiring unit 21 may acquire time-series data.

The first feature amount extracting unit 22 may generate a feature map including temporal information (that is, the first feature map FM1) using the acquired time-series data. In addition, the second feature amount extracting unit 23 may generate a feature map including temporal information (that is, the individual second feature map FM2 and the individual third feature map FM3) using the acquired time-series data.

As a result, it is possible not only to cope with temporal analysis by the time analysis unit 62 but also to suppress the occurrence of so-called "detection blurring". That is, for a certain object, it is possible to suppress the occurrence of a phenomenon in which a state where the object is detected and a state where the object is not detected are alternately repeated in time.

Furthermore, the first neural network NN1 may have a structure in which the acquired time-series data is processed in time series. For example, the CNN in the first neural network NN1 may use a long short term memory (LSTM) network.

As described above, the monitoring device 600 according to the fourth embodiment includes the object detection device 200, the object detection device 200a, or the object detection device 200b, the analysis unit 51 that analyzes the detection result of the object detection unit 24, and the output control unit 52 that outputs an analysis result signal corresponding to the analysis result of the analysis unit 51. As a result, it is possible to achieve monitoring based on a result of highly accurate object detection.

Note that it is possible to freely combine the embodiments, modify any component of each embodiment, or omit any component of each embodiment within the scope of the present disclosure.

INDUSTRIAL APPLICABILITY

The object detection device, the monitoring device, and the training device according to the present disclosure can be used for an electronic mirror, for example.

REFERENCE SIGNS LIST

1: camera, 2: storage device, 3, 3*a*, 3*b*: storage device, 4: clock, 5: storage device, 6: locator, 7: storage device, 8: output device, 11: feature-map storage unit, 12: image-data storage unit, 13: time-based parameter storage unit, 14: time-based image-data storage unit, 15: location-based parameter storage unit, 16: location-based image-data storage unit, 21: image data acquiring unit, 22: first feature amount extracting unit, 23: second feature amount extracting unit, 24: object detection unit, 25: training unit, 26: time information acquiring unit, 27: parameter selection unit, 28: location information acquiring unit, 29: parameter selection unit, 31: first feature map generating unit, 32: second feature map generating unit, 33: third feature map generating unit, 34: position estimation unit, 35: type estimation unit, 36: fourth feature map generating unit, 41: processor, 42: memory, 43: processing circuit, 44: processor, 45: memory, 46: processing circuit, 51: analysis unit, 52: output control unit, 61: abnormality determination unit, 62: time analysis unit, 63: threat determination unit, 64: space analysis unit, 65: image-output control unit, 66: audio-output control unit, 71: display, 72: speaker, 81: processor, 82: memory, 83: processing circuit, 100, 100*a*, 100*b*: object detection system, 200, 200*a*, 200*b*: object detection device, 300, 300*a*, 300*b*: training system, 400: training device, 500: monitoring system, 600: monitoring device

The invention claimed is:

1. An object detection device comprising:
   an image data acquirer to acquire image data indicating an image captured by a camera;
   a first feature amount extractor to generate a first feature map using the image data;
   a second feature amount extractor to generate a second feature map using the image data and to generate a third feature map by performing addition or multiplication of the second feature map using the first feature map and weighting the second feature map; and
   an object detector to detect an object in the image captured using the third feature map, wherein
   a first feature amount in the first feature map uses a mid-level feature corresponding to objectness, and
   a second feature amount in the second feature map uses a high-level feature.

2. The object detection device according to claim 1, wherein the second feature amount extractor performs the weighting by adding each of the first feature amounts in the first feature map to the corresponding second feature amount in each of the second feature maps.

3. The object detection device according to claim 2, wherein the second feature amount extractor sets importance in the weighting on a basis of at least one of structural similarity or image similarity correlation.

4. The object detection device according to claim 1, wherein the second feature amount extractor performs the weighting by multiplying each of the first feature amounts in the first feature map by the corresponding second feature amount in each of the second feature maps.

5. The object detection device according to claim 1, wherein the first feature amount extractor generates a plurality of fourth feature maps including different fourth feature amounts from the first feature map, and
   the second feature amount extractor performs the weighting by adding each of the fourth feature amounts in the fourth feature map to the corresponding second feature amount in the second feature map corresponding to the fourth feature map.

6. The object detection device according to claim 1, wherein
   the first feature amount extractor generates a plurality of fourth feature maps including different fourth feature amounts from the first feature map, and
   the second feature amount extractor performs the weighting by multiplying each of the fourth feature amounts in the fourth feature map by the corresponding second feature amount in the second feature map corresponding to the fourth feature map.

7. The object detection device according to claim 1, wherein the second feature amount extractor performs the weighting by adding the first feature map to the second feature map in a dimensional direction of the second feature map.

8. The object detection device according to claim 1, wherein the first feature amount extractor can be trained by unsupervised training.

9. The object detection device according to claim 8, wherein the first feature map generated by the first feature amount extractor is at least one of a saliency map based on the image captured as the image data, a depth map based on a distance image or a sonar image as the image data, or a heat map based on a thermal image as the image data.

10. The object detection device according to claim 1, wherein the second feature amount extractor can be trained by supervised training.

11. The object detection device according to claim 10, wherein the second feature amount extractor generates the second feature map using a convolutional neural network.

12. The object detection device according to claim 11, wherein the second feature amount extractor can be trained by deep learning.

13. The object detection device according to claim 10, further comprising:
    a time information acquirer to acquire time information; and
    a parameter selector to select a parameter set corresponding to a time indicated by the time information from parameter sets included in a time-based trained parameter database, wherein
    the second feature amount extractor generates the second feature map and the third feature map using a trained parameter included in a parameter set selected by the parameter selector.

14. The object detection device according to claim 10, further comprising:
    a location information acquirer to acquire location information; and
    a parameter selector to select a parameter set corresponding to a location indicated by the location information from parameter sets included in a location-based trained parameter database, wherein
    the second feature amount extractor generates the second feature map and the third feature map using a trained parameter included in a parameter set selected by the parameter selector.

15. The object detection device according to claim 1, wherein by performing the weighting, each of the second feature amounts in each of the second feature maps is reinforced in accordance with the corresponding objectness.

16. The object detection device according to claim 1, wherein the object detector detects the object by performing a convolution operation a plurality of times with kernel sizes different from each other.

17. The object detection device according to claim 1, wherein the object detector can be trained by supervised training.

18. The object detection device according to claim 17, wherein the object detector estimates a position of the object by regression and estimates a type of the object by classification.

19. The object detection device according to claim 18, wherein a type of the object includes a traveling direction of the object.

20. A monitoring device comprising:
the object detection device according to claim 1;
an analyzer to analyze a detection result of the object detector; and
an output controller to output an analysis result signal corresponding to an analysis result of the analyzer.

21. The monitoring device according to claim 20, wherein the analyzer includes at least one of an abnormality determiner to determine a degree of abnormality of the object or a threat determiner to determine a degree of threat of the object.

22. The monitoring device according to claim 21, wherein the abnormality determiner determines the degree of abnormality on a basis of a position of the object indicated by a detection result of the object detector.

23. The monitoring device according to claim 21, wherein the threat determiner determines the degree of threat on a basis of a traveling direction of the object indicated by a detection result of the object detector.

24. The monitoring device according to claim 21, wherein the threat determiner determines the degree of threat on a basis of a temporal change amount of a size of the object in the image captured.

25. The monitoring device according to claim 24, wherein the analyzer includes a time analyzer to calculate the temporal change amount by temporally analyzing a detection result of the object detector.

26. The monitoring device according to claim 21, wherein the analyzer includes a space analyzer to generate a risk map by spatially analyzing at least one of a determination result of the abnormality determiner or a determination result of the threat determiner.

27. The monitoring device according to claim 26, wherein the output controller causes a display to display a risk map image corresponding to the risk map by outputting the analysis result signal to the display.

28. A training device comprising:
an image data acquirer to acquire image data indicating a training image;
a first feature amount extractor to generate a first feature map using the image data;
a second feature amount extractor to generate a second feature map using the image data and to generate a third feature map by performing addition or multiplication of the second feature map using the first feature map and weighting the second feature map;
an object detector to detect an object in the training image using the third feature map; and
a trainer to train the second feature amount extractor and the object detector in accordance with a detection result of the object detector, wherein
a first feature amount in the first feature map uses a mid-level feature corresponding to objectness, and
a second feature amount in the second feature map uses a high-level feature.

29. A model generation method comprising:
acquiring image data indicating a training image;
generating a first feature map using the image data;
generating a second feature map using the image data and generating a third feature map by performing arithmetic operation of the second feature map using the first feature map and weighting the second feature map;
detecting an object in the training image using the third feature map; and
generating a machine learning model that receives the image data as input and outputs a detection result of the object by training a second feature amount extractor and an object detector in accordance with a detection result of the object detector, wherein
a first feature amount in the first feature map uses a mid-level feature corresponding to objectness, and
a second feature amount in the second feature map uses a high-level feature.

* * * * *